United States Patent [19]
Murata et al.

[11] Patent Number: 6,129,075
[45] Date of Patent: Oct. 10, 2000

[54] COMPRESSION IGNITION TYPE ENGINE

[75] Inventors: Hiroki Murata, Susono; Shizuo Sasaki, Numazu, both of Japan

[73] Assignee: Toyota Jidosha Kabushiki Kaisha, Toyota, Japan

[21] Appl. No.: 09/253,516

[22] Filed: Feb. 19, 1999

[30] Foreign Application Priority Data

Mar. 17, 1998 [JP] Japan .................................. 10-067017

[51] Int. Cl.$^7$ .................................................. F02M 25/07
[52] U.S. Cl. ........................................ 123/568.21; 60/711
[58] Field of Search ...................... 123/568.21, 198 DB, 123/325; 60/698, 702, 706, 711, 274

[56] References Cited

U.S. PATENT DOCUMENTS

| | | |
|---|---|---|
| 4,142,493 | 3/1979 | Schira et al. . |
| 4,454,854 | 6/1984 | Gotoh et al. . |
| 5,172,550 | 12/1992 | Takeshima . |
| 5,482,020 | 1/1996 | Shimizu et al. . |
| 5,632,144 | 5/1997 | Isobe . |
| 5,732,554 | 3/1998 | Sasaki et al. . |
| 5,785,138 | 7/1998 | Yoshida .................................. 180/65.2 |
| 5,890,360 | 4/1999 | Sasaki et al. ............................. 60/278 |
| 5,971,088 | 10/1999 | Smith ...................................... 180/165 |
| 6,055,968 | 5/2000 | Sasaki et al. ....................... 123/568.21 |
| 6,057,605 | 5/2000 | Bourne et al. .......................... 290/40 C |

FOREIGN PATENT DOCUMENTS

| | | |
|---|---|---|
| 4-334750 | 11/1992 | Japan . |
| 6-346763 | 12/1994 | Japan . |
| 7-4287 | 1/1995 | Japan . |

OTHER PUBLICATIONS

Sato, Yasuo et al., "A Simultaneous Reduction of $NO_X$ and Soot in Diesel Engines Under a New Combustion System," Society of Automotive Engineers of Japan, Paper No. 205, Spring Symposium 1996, pp. 81–84.

Primary Examiner—Henry C. Yuen
Assistant Examiner—Arnold Castro
Attorney, Agent, or Firm—Oliff & Berridge, PLC

[57] ABSTRACT

A compression ignition type engine, wherein a first combustion where the amount of the recirculated exhaust gas supplied to the combustion chamber is larger than the amount of recirculated exhaust gas where the amount of production of soot peaks and almost no soot is produced and a second combustion where the amount of recirculated exhaust gas supplied to the combustion chamber is smaller than the amount of recirculated exhaust gas where the amount of production of soot peaks are selectively switched between. When the first combustion is switched to the second combustion or the second combustion is switched to the first combustion, the amount of fuel injection is reduced and the amount of reduction of the output torque of the engine is compensated for by the output torque of an electric motor.

18 Claims, 23 Drawing Sheets

Fig. 5
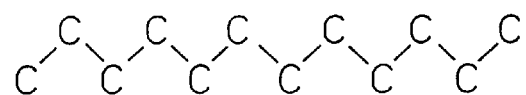
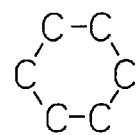 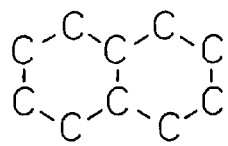
Fig. 6
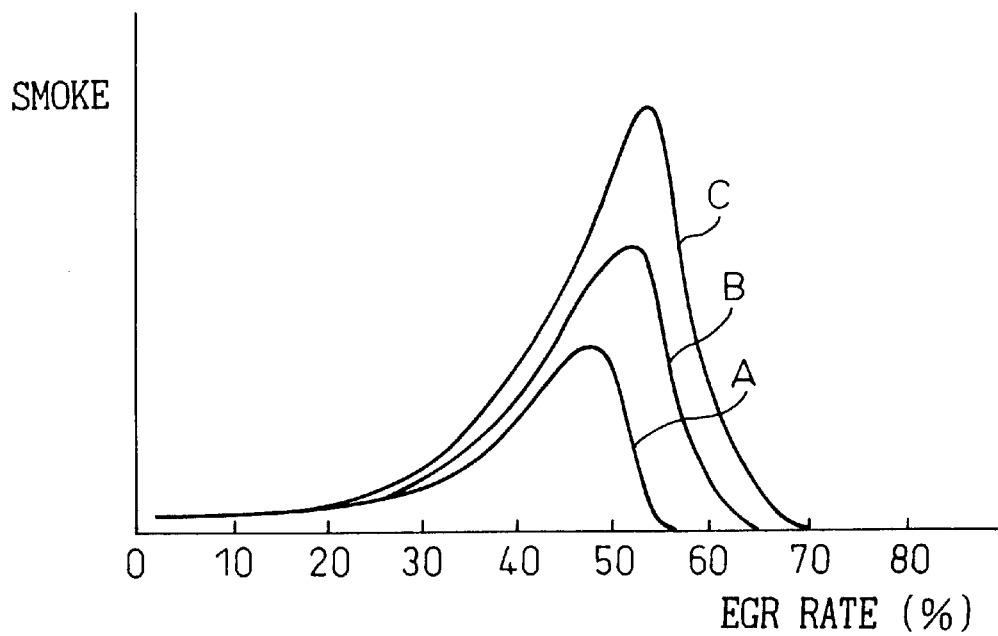

COMPRESSION IGNITION TYPE ENGINE

BACKGROUND OF THE INVENTION

1. Field of the Invention

The present invention relates to a compression ignition type engine.

2. Description of the Related Art

In the past, in an internal combustion engine, for example, a diesel engine, the production of NOx has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas+amount of intake air), the lower the combustion temperature in the engine intake passage. When the combustion temperature falls, the amount of NOx produced falls and therefore the higher the EGR rate, the lower the amount of NOx produced.

In this way, in the past, the higher the EGR rate, the lower the amount of NOx produced can become. If the EGR rate is increased, however, the amount of soot produced, that is, the smoke, starts to sharply rise when the EGR rate passes a certain limit. In this point, in the past, it was believed that if the EGR rate was increased, the smoke would increase without limit. Therefore, it was believed that the EGR rate at which smoke starts to rise sharply was the maximum allowable limit of the EGR rate.

Therefore, in the past, the EGR rate was set within a range not exceeding the maximum allowable limit (for example, see Japanese Unexamined Patent Publication (Kokai) No. 4-334750). The maximum allowable limit of the EGR rate differed considerably according to the type of the engine and the fuel, but was from 30 percent to 50 percent or so. Accordingly, in conventional diesel engines, the EGR rate was suppressed to 30 percent to 50 percent at a maximum.

Since it was believed in the past that there was a maximum allowable limit to the EGR rate, in the past the EGR rate had been set so that the amount of NOx and smoke produced would become as small as possible within a range not exceeding that maximum allowable limit. Even if the EGR rate is set in this way so that the amount of NOx and smoke produced becomes as small as possible, however, there are limits to the reduction of the amount of production of NOx and smoke. In practice, therefore, a considerable amount of NO and smoke continues being produced.

The present inventors, however, discovered in the process of studies on the combustion in diesel engines that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the smoke will almost completely disappear, that is, almost no soot will be produced. Further, they found that the amount of NOx produced at this time was extremely small. They engaged in further studies later based on this discovery to determine the reasons why soot was not produced and as a result constructed a new system of combustion able to simultaneously reduce the soot and NOx more than ever before. This new system of combustion will be explained in detail later, but briefly it is based on the idea of stopping the growth of hydrocarbons into soot at a stage before the hydrocarbons grow to soot.

That is, what was found from repeated experiments and research was that the growth of hydrocarbons into soot stops at a stage before that happens when the temperatures of the fuel and the gas around the fuel at the time of combustion in the combustion chamber are lower than a certain temperature and the hydrocarbons grow to soot all at once when the temperatures of the fuel and the gas around the fuel become higher than a certain temperature. In this case, the temperatures of the fuel and the gas around the fuel are greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperatures of the fuel and the gas around the fuel.

Therefore, if the temperatures of the fuel and the gas around the fuel at the time of combustion in the combustion chamber are suppressed to less than the temperature at which the growth of the hydrocarbons stops midway, soot is no longer produced. The temperatures of the fuel and the gas around the fuel at the time of combustion in the combustion chamber can be suppressed to less than the temperature at which the growth of the hydrocarbons stops midway by adjusting the amount of heat absorbed by the gas around the fuel. On the other hand, the hydrocarbons stopped in growth midway before becoming soot can be easily removed by after-treatment using an oxidation catalyst etc. This is the basic thinking behind this new system of combustion.

In this new method of combustion, however, it is necessary to make the EGR rate at least more than 55 percent so as to simultaneously reduce the soot and NOx. It is however only possible to make the EGR rate more than about 55 percent when the amount of intake air is small, that is, when the engine load is relatively low. Once the amount of intake air exceeds a certain limit, it is no longer possible to increase the amount of intake air without lowering the EGR rate. When the amount of intake air exceeds a certain limit, however, that is, when the amount of fuel injection is relatively large, if the EGR is allowed to gradually fall from 55 percent along with the increase of the amount of intake air, the problem will arise of the production of a large amount of smoke.

SUMMARY OF THE INVENTION

An object of the present invention is to provide a compression ignition type engine capable of suppressing the generation of soot when the EGR rate is lowered.

According to the present invention, there is provided a compression ignition type engine in which an amount of production of soot gradually increases and then peaks when an amount of inert gas in a combustion chamber increases and in which a further increase of the amount of inert gas in the combustion chamber results in a temperature of fuel and surrounding gas at the time of combustion in the combustion chamber becoming lower than a temperature of production of soot and therefore almost no production of soot any longer, the engine comprising: switching means for selectively switching between a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks; and, drive power generating means for generating drive power separately from a drive power of the engine, the amount of fuel supplied to the engine being made to be reduced and drive power being generated from the drive power generating means when switching from the first combustion to the second combustion or from the second combustion to the first combustion by the switching means.

BRIEF DESCRIPTION OF THE DRAWINGS

The present invention may be more fully understood from the description of the preferred embodiments of the invention set forth below together with the accompanying drawings, in which:

FIG. 5 is a view of a fuel molecule;

FIG. 6 is a view of the relationship between the amount of smoke produced and the EGR rate;

DESCRIPTION OF THE PREFERRED EMBODIMENTS

Figure 1:
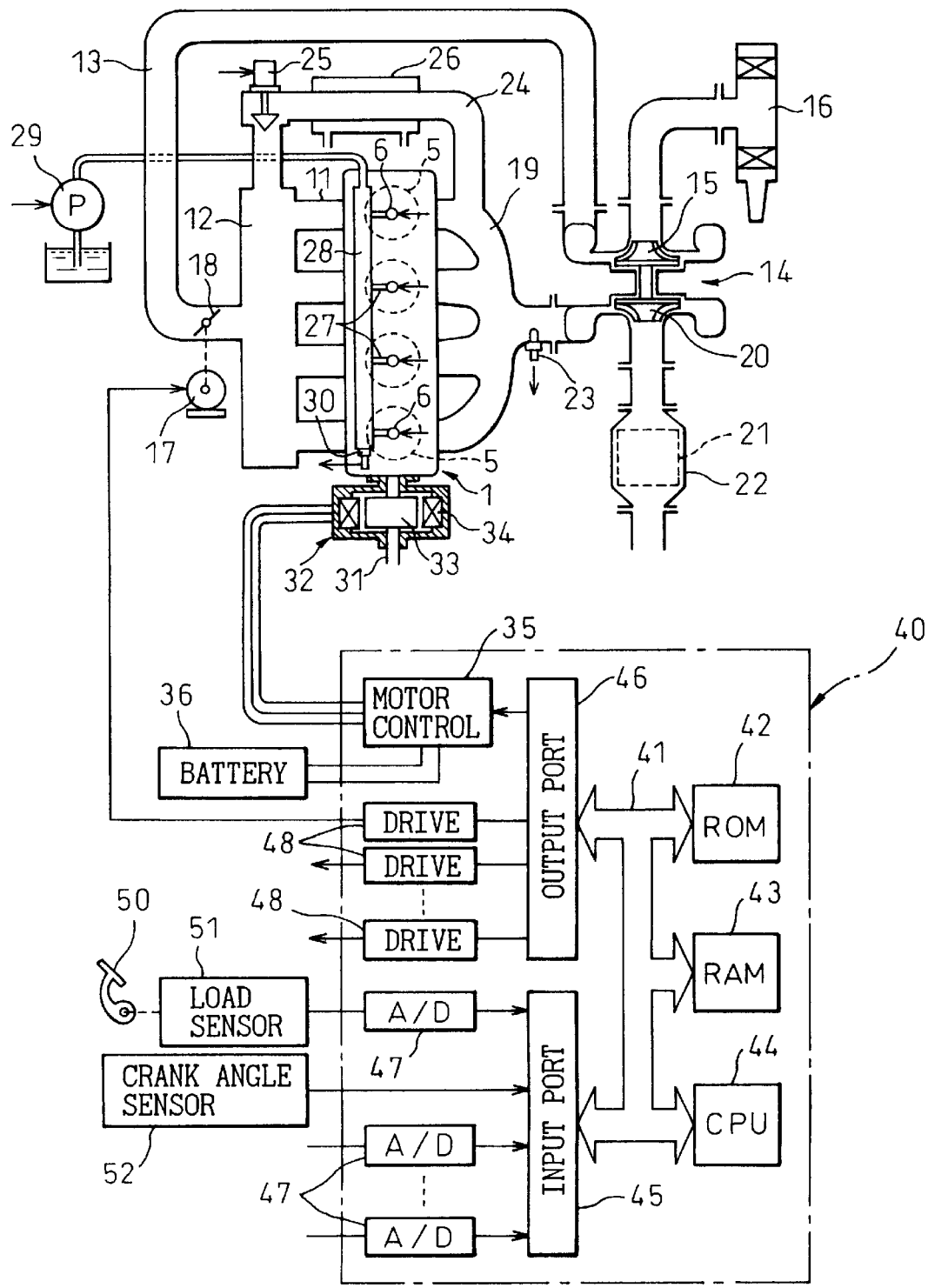
FIG. 1 is an overall view of a compression ignition type engine.
Figure 2:
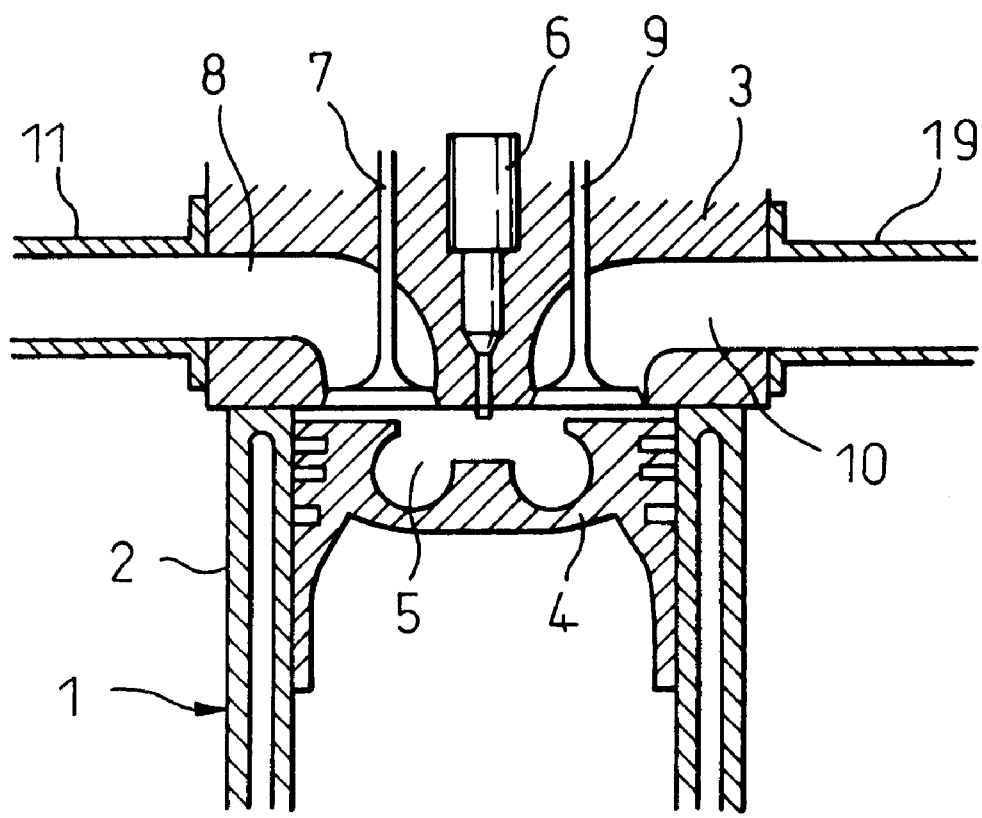
FIG. 2 is a side sectional view of the engine body.

FIG. 1 and FIG. 2 are views of the case of application of the present invention to a four-stroke compression ignition type engine.

Referring to FIG. 1 and FIG. 2, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12.

The surge tank 12 is connected through an intake duct 13 and a compressor 15 of an exhaust turbocharger 14 to an air cleaner 16. A throttle valve 18 driven by an electric motor 17 is arranged in the intake duct 13. On the other hand, the exhaust port 10 is connected through an exhaust manifold 19 and exhaust turbine 20 of the exhaust turbocharger 14 to a catalytic converter 22 housing a catalyst 21 having an oxidation action. An air-fuel ratio sensor 23 is arranged in the exhaust manifold 19.

The exhaust manifold 19 and surge tank 12 are connected with each other through an EGR passage 24. An electrically controlled EGR control valve 25 is arranged in an EGR passage 24. Further, a cooling apparatus 26 for cooling the EGR gas flowing through the EGR passage 24 is provided around the EGR passage 25. In the embodiment shown in FIG. 1, the engine cooling water is guided to the cooling apparatus 26 where the engine cooling water is used to cool the EGR gas.

On the other hand, each fuel injector 6 is connected through a fuel supply tube 27 to the fuel reservoir, that is, a common rail 28. Fuel is supplied to the common rail 28 from an electrically controlled variable discharge fuel pump 29. Fuel supplied in the common rail 28 is supplied through each fuel supply tube 27 to the fuel injectors 6. A fuel pressure sensor 30 for detecting the fuel pressure in the common rail 28 is attached to the common rail 28. The amount of discharge of the fuel pump 29 is controlled based on the output signal of the fuel pressure sensor 30 so that the fuel pressure in the common rail 28 becomes the target fuel pressure.

An electric motor 32 is attached to an output shaft 31 of the engine. In the embodiment shown in FIG. 1, the electric motor 32 is comprised of an alternating current synchronous electric motor provided with a rotor 33 attached on the output shaft 31 of the engine and mounting a plurality of permanent magnets on its outer circumference and a stator 34 around which is wound an exciting coil forming a rotating magnetic field. The exciting coil of the stator 34 is connected to a motor drive control circuit 35, while the motor drive control circuit 35 is connected to a battery 36 generating a DC high voltage.

An electronic control unit 40 is comprised of a digital computer and is provided with a ROM (read only memory) 42, a RAM (random access memory) 43, a CPU (microprocessor) 44, an input port 45, and an output port 46 connected with each other by a bidirectional bus 41. The output signal of the air-fuel ratio sensor 23 is input through a corresponding AD converter 47 to the input port 45. Further, the output signal of the fuel pressure sensor 30 is input through a corresponding AD converter 47 to the input port 45. An accelerator pedal 50 has connected to it a load sensor 51 for generating an output voltage proportional to the amount of depression L of the accelerator pedal 50. The output voltage of the load sensor 51 is input through a corresponding AD converter 47 to the input port 45. Further, the input port 45 has connected to it a crank angle sensor 52 for generating an output pulse each time the crankshaft rotates by for example 30°. On the other hand, the output port 46 has connected to it through a corresponding drive circuit 48 the fuel injector 6, electric motor 17, EGR control valve 25, fuel pump 29, and motor drive control circuit 35.

Ordinarily, the supply of power to the exciting coil of the stator 34 of the electric motor 32 is stopped. At this time, the rotor 33 rotates along with the output shaft 31 of the engine. On the other hand, when the electric motor 32 is driven, the DC high voltage of the battery 36 is converted at the motor drive control circuit 35 to a three-phase alternating current with a frequency fm and a current Im. This three-phase alternating current is supplied to the exciting coil of the stator 34. This frequency fm is the frequency necessary for making the rotating magnetic field produced by the exciting coil rotate in synchronization with the rotation of the rotor 33. This frequency fm is calculated by the CPU 44 based on the output signal of the rotational speed sensor 52. In the motor drive control circuit 35, the frequency fm is made the frequency of the three-phase alternating current.

On the other hand, the output torque of the electric motor 32 is substantially proportional to the current value Im of the three-phase alternating current. This current value Im is calculated in the CPU 44 based on the requested output torque of the electric motor 32. In the motor drive control circuit 35, this current value Im is made the current value of the three-phase alternating current.

Further, if the electric motor 32 is placed in a state driven by the engine, the battery 36 is charged by the power produced at this time. Whether or not to drive the electric motor 32 by the engine is judged by the CPU 44. When it is judged that the electric motor 32 should be driven by the engine, the motor control drive circuit 5 controls the system so that the battery 36 is charged by the power produced by the electric motor 32.

Figure 3:
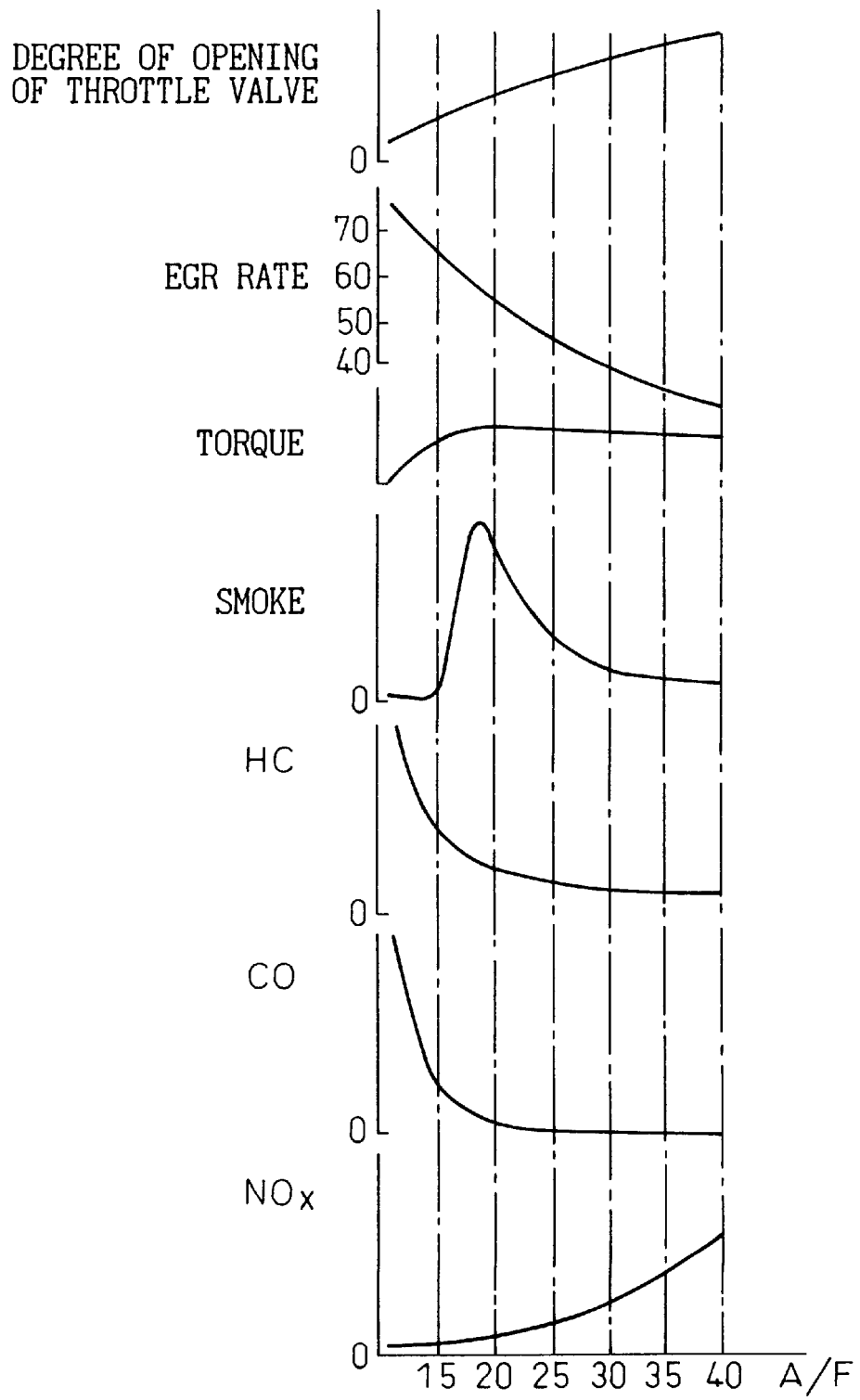
FIG. 3 is a view of the amount of generation of smoke and NOx.

FIG. 3 shows an example of an experiment showing the changes in the output torque and the changes in the amount of smoke, HC, CO, and NOx exhausted when changing the air-fuel ratio A/F (abscissa in FIG. 3) by changing the opening degree of the throttle valve 18 and the EGR rate at the time of engine low load operation. As will be understood from FIG. 3, in this experiment, the EGR rate becomes larger the smaller the air-fuel ratio A/F. When below the stoichiometric air-fuel ratio (≈14.6), the EGR rate becomes over 65 percent.

As shown in FIG. 3, if increasing the EGR rate to reduce the air-fuel ratio A/F, when the EGR rate becomes close to 40 percent and the air-fuel ratio A/F becomes 30 or so, the amount of smoke produced starts to increase. Next, when the EGR rate is further raised and the air-fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air-fuel ratio A/F becomes close to 15.0, the smoke produced becomes substantially zero. That is, almost no soot is produced any longer. At this time, the output torque of the engine falls somewhat and the amount of NOx produced becomes considerably lower. On the other hand, at this time, the amounts of HC and CO produced start to increase.

Figure 4A:
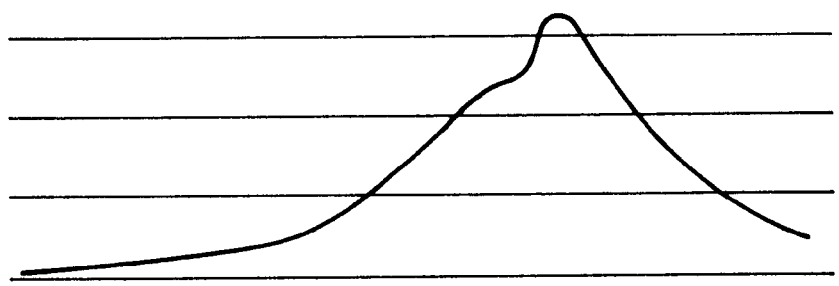
FIGS. 4A and 4B are views of the combustion pressure.
Figure 4B:
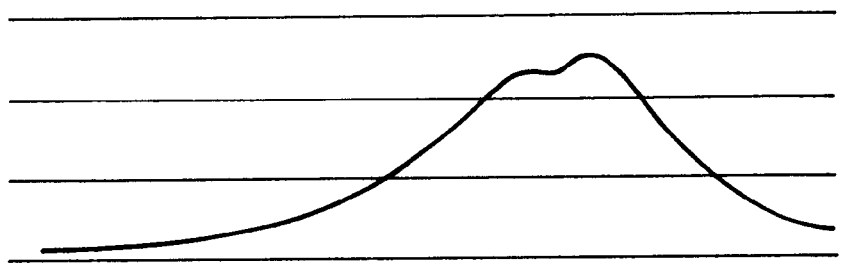

FIG. 4A shows the changes in compression pressure in the combustion chamber 5 when the amount of smoke produced is the greatest near an air-fuel ratio A/F of 21. FIG. 4B shows the changes in compression pressure in the combustion chamber 5 when the amount of smoke produced is substantially zero near an air-fuel ratio A/F of 18. As will be understood from a comparison of FIG. 4A and FIG. 4B, the combustion pressure is lower in the case shown in FIG. 4B where the amount of smoke produced is substantially zero than the case shown in FIG. 4A where the amount of smoke produced is large.

The following may be said from the results of the experiment shown in FIG. 3 and FIGS. 4A and 4B. That is, first, when the air-fuel ratio A/F is less than 15.0 and the amount of smoke produced is substantially zero, the amount of NOx produced falls considerably as shown in FIG. 3. The fact that the amount of NOx produced falls means that the combustion temperature in the combustion chamber 5 falls. Therefore, it can be said that when almost no soot is produced, the combustion temperature in the combustion chamber 5 becomes lower. The same thing may be said from FIGS. 4A and 4B. That is, in the state shown in FIG. 4B where almost no soot is produced, the combustion pressure becomes lower, therefore the combustion temperature in the combustion chamber 5 becomes lower at this time.

Second, when the amount of smoke produced, that is, the amount of soot produced, becomes substantially zero, as shown in FIG. 3, the amounts of HC and CO exhausted increase. This means that the hydrocarbons are exhausted without growing into soot. That is, the straight chain hydrocarbons and aromatic hydrocarbons contained in the fuel and shown in FIG. 5 decompose when raised in temperature in an oxygen poor state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons shown in FIG. 5 grow to soot through the soot precursor. Therefore, as explained above, when the amount of production of soot becomes substantially zero, the amount of exhaust of HC and CO increases as shown in FIG. 3, but the HC at this time is a soot precursor or a state of hydrocarbons before that.

Summarizing these considerations based on the results of the experiments shown in FIG. 3 and FIGS. 4A and 4B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperature of the fuel and the gas around the fuel in the combustion chamber 5 is below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air-fuel ratio, and the compression ratio, so it cannot be said what degree it is, but this certain temperature is deeply related with the amount of production of NOx. Therefore, this certain temperature can be defined to a certain degree from the amount of production of NOx. That is, the greater the EGR rate, the lower the temperatures of the fuel and the gas surrounding it at the time of combustion and the lower the amount of NOx produced. At this time, when the amount of NOx produced becomes around 10 ppm or less, almost no soot is produced any more. Therefore, the above certain temperature substantially matches the temperature when the amount of NOx produced becomes 10 ppm or less.

Once soot is produced, it is impossible to remove it by after-treatment using an oxidation catalyst etc. As opposed to this, a soot precursor or a state of hydrocarbons before this can be easily removed by after-treatment using an oxidation catalyst etc. Considering after-treatment by an oxidation catalyst etc., there is an extremely great difference between whether the hydrocarbons are exhausted from the combustion chamber 5 in the form of a soot precursor or a state before that or exhausted from the combustion chamber 5 in the form of soot. The new combustion system used in the present invention is based on the idea of exhausting the hydrocarbons from the combustion chamber 5 in the form of a soot precursor or a state before that without allowing the production of soot in the combustion chamber 5 and causing the hydrocarbons to oxidize by an oxidation catalyst etc.

Now, to stop the growth of hydrocarbons in the state before the production of soot, it is necessary to suppress the temperature of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperature of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperatures of the fuel and the gas around it to a temperature lower than the temperature at which soot is produced, an amount of inert gas enough to absorb an amount of heat sufficient for lowering the temperatures is required. Therefore, if the amount of fuel increases, the amount of inert gas required increases along with the same. Note that in this case the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

FIG. 6 shows the relationship between the EGR rate and smoke when changing the degree of cooling of the EGR gas using the EGR gas as an inert gas. That is, in FIG. 6, the curve A shows the case when force cooling the EGR gas to maintain the temperature of the EGR gas at about 90° C., the curve B shows the case when cooling the EGR gas by a small sized cooling device, and the curve C shows the case when not force cooling the EGR gas.

As shown by the curve A in FIG. 6, when force cooling the EGR gas, the amount of soot produced peaks when the EGR rate becomes slightly lower than 50 percent. In this case, almost no soot is produced any longer when the EGR rate is made at least about 55 percent.

On the other hand, as shown by the curve B in FIG. 6, when slightly cooling the EGR gas, the amount of soot produced peaks when the EGR rate becomes slightly higher than 50 percent. In this case, almost no soot is produced any longer when the EGR rate is made at least about 65 percent.

Further, as shown by the curve C in FIG. 6, when not force cooling the EGR gas, the amount of soot produced peaks when the EGR rate is near 55 percent. In this case, almost no soot is produced any longer when the EGR rate is made at least about 70 percent.

Note that FIG. 6 shows the amount of smoke produced when the engine load is relatively high. When the engine load becomes smaller, the EGR rate where the amount of soot produced peaks falls somewhat and the lower limit of the EGR rate where almost no soot is produced any longer falls somewhat as well. In this way, the lower limit of the EGR rate where almost no soot is produced any longer changes in accordance with the degree of cooling of the EGR gas and the engine load.

Figure 7:
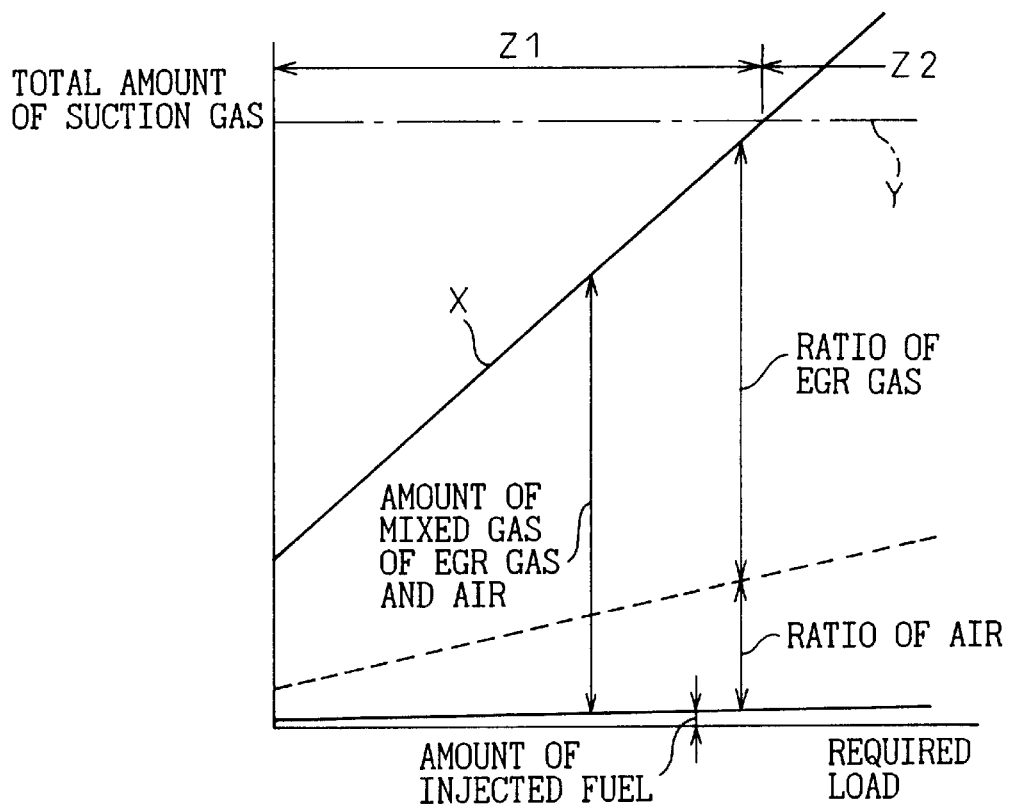
FIG. 7 is a view of the relationship between the amount of injected fuel and the amount of mixed gas.

FIG. 7 shows the amount of mixed gas of EGR gas and air, the ratio of air in the mixed gas, and the ratio of EGR gas in the mixed gas required for making the temperatures of the fuel and the gas around it at the time of combustion a temperature lower than the temperature at which soot is produced in the case of use of EGR gas as an inert gas. Note that in FIG. 7, the ordinate shows the total amount of suction gas taken into the combustion chamber 5. The broken line Y shows the total amount of suction gas able to be taken into the combustion chamber 5 when supercharging is not being performed. Further, the abscissa shows the required load. Z1 shows the low load operating region.

Referring to FIG. 7, the ratio of air, that is, the amount of air in the mixed gas, shows the amount of air necessary for causing the injected fuel to completely burn. That is, in the case shown in FIG. 7, the ratio of the amount of air and the amount of injected fuel becomes the stoichiometric air-fuel ratio. On the other hand, in FIG. 7, the ratio of EGR gas, that is, the amount of EGR gas in the mixed gas, shows the minimum amount of EGR gas required for making the temperatures of the fuel and the gas around it a temperature lower than the temperature at which soot is produced. This amount of EGR gas is, expressed in terms of the EGR rate, about at least 55 percent and, in the embodiment shown in FIG. 7, is at least 70 percent. That is, if the total amount of suction gas taken into the combustion chamber 5 is made the solid line X in FIG. 7 and the ratio between the amount of air and amount of EGR gas in the total amount of suction gas X is made the ratio shown in FIG. 7, the temperatures of the fuel and the gas around it becomes a temperature lower than the temperature at which soot is produced and therefore no soot at all is produced any longer. Further, the amount of NOx produced at this time is around 10 ppm or less and therefore the amount of NOx produced becomes extremely small.

If the amount of fuel injected increases, the amount of heat generated at the time of combustion increases, so to maintain the temperatures of the fuel and the gas around it at a temperature lower than the temperature at which soot is produced, the amount of heat absorbed by the EGR gas must be increased. Therefore, as shown in FIG. 7, the amount of EGR gas has to be increased the greater the amount of injected fuel. That is, the amount of EGR gas has to be increased as the required load becomes higher.

On the other hand, in the load region Z2 of FIG. 7, the total amount of suction gas X required for inhibiting the production of soot exceeds the total amount of suction gas Y which can be taken in. Therefore, in this case, to supply the total amount of suction gas x required for inhibiting the production of soot into the combustion chamber 5, it is necessary to supercharge or pressurize both of the EGR gas and the suction gas or the EGR gas. When not supercharging or pressurizing the EGR gas etc., in the load region Z2, the total amount of suction gas X matches with the total amount of suction gas Y which can be taken in. Therefore, in the case, to inhibit the production of soot, the amount of air is reduced somewhat to increase the amount of EGR gas and the fuel is made to burn in a state where the air-fuel ratio is rich.

As explained above, FIG. 7 shows the case of combustion of fuel at the stoichiometric air-fuel ratio. In the low load operating region Z1 shown in FIG. 7, even if the amount of air is made smaller than the amount of air shown in FIG. 7, that is, even if the air-fuel ratio is made rich, it is possible to obstruct the production of soot and make the amount of NOx produced around 10 ppm or less. Further, in the low load region Z1 shown in FIG. 7, even if the amount of air is made greater than the amount of air shown in FIG. 7, that is, the average value of the air-fuel ratio is made a lean air-fuel ratio of 17 to 18, it is possible to obstruct the production of soot and make the amount of NOx produced around 10 ppm or less.

That is, when the air-fuel ratio is made rich, the fuel becomes in excess, but since the fuel temperature is suppressed to a low temperature, the excess fuel does not grow into soot and therefore soot is not produced. Further, at this time, only an extremely small amount of NOx is produced. On the other hand, when the average air-fuel ratio is lean or when the air-fuel ratio is the stoichiometric air-fuel ratio, a small amount of soot is produced if the combustion temperature becomes higher, but in the present invention, the combustion temperature is suppressed to a low temperature, so no soot at all is produced. Further, only an extremely small amount of NOx is produced.

In this way, in the engine low load operating region Z1, regardless of the air-fuel ratio, that is, whether the air-fuel ratio is rich or the stoichiometric air-fuel ratio or the average air-fuel ratio is lean, no soot is produced and the amount of NOx produced becomes extremely small. Therefore, considering the improvement of the fuel efficiency, it may be said to be preferable to make the average air-fuel ratio lean.

In the new system of combustion used in the present invention, however, it is necessary to make the EGR rate at least more than about 55 percent so as to simultaneously reduce the soot and NOx. It is however only possible to make the EGR rate more than about 55 percent when the amount of intake air is small, that is, when the engine low is relatively low. Once the amount of intake air exceeds a certain limit, that is, the required load becomes higher than a certain limit, it is no longer possible to increase the amount of intake air without lowering the EGR rate. In this case, in the example of the experiment shown in FIG. 3, however, if the EGR is allowed to gradually fall from about 65 percent along with the increase of the amount of intake air, that is, if the air-fuel ratio is gradually increased along with the required load becoming higher, a large amount of smoke will be produced. Therefore, when the required load exceeds a certain limit, it is not possible to make the EGR rate gradually fall from about 65 percent and gradually increase the air-fuel ratio as the required load becomes higher.

In this case, to prevent the production of a large amount of smoke, it is necessary to jump over the range of EGR rate from about 40 percent to about 65 percent where a large amount of smoke is produced when the required load exceeds the certain limit. That is, it is necessary to maintain the EGR rate at least at about 55 percent when the required load is low and to reduce the EGR rate stepwise to less than about 50 percent when the required load becomes higher and it is no longer possible to maintain the EGR rate at above about 55 percent.

When the EGR rate is above about 55 percent, as explained above, the temperature of the fuel and the gas surrounding it becomes a temperature lower than the temperature at which soot is produced. At this time, first combustion, that is, low temperature combustion, is performed. As opposed to this, when the EGR rate is reduced to less than about 50 percent, the temperature of the fuel and the gas surrounding it becomes higher than the temperature at which soot is produced. At this time, the first combustion, that is, low temperature combustion, can no longer be performed. In the embodiment of the present invention, when the low temperature combustion cannot be performed in this way, second combustion, that is, the conventionally normally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks.

Figure 8:
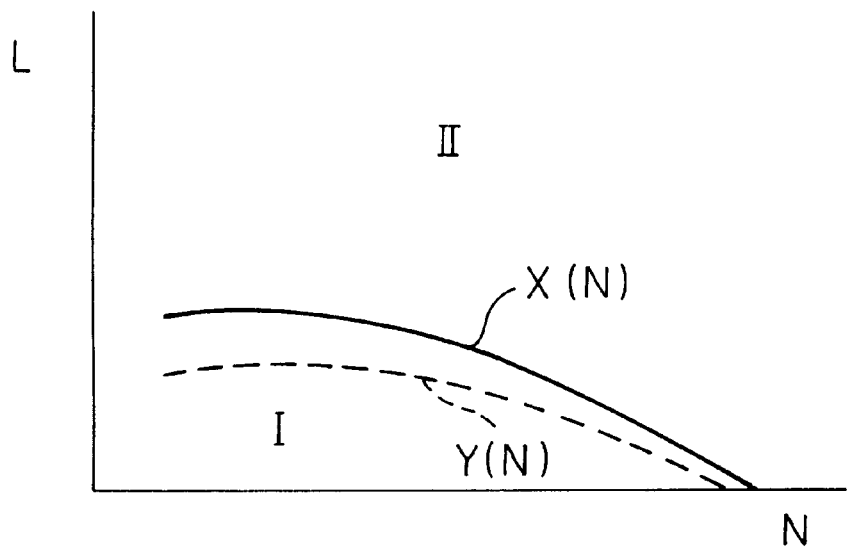
FIG. 8 is a view of a first operating region I and a second operating region II.

FIG. 8 shows a first operating region I where the EGR rate is made at least about 55 percent and first combustion, that is, the low temperature combustion, is performed, and a second operating region II where the EGR rate is made not more than about 50 percent and second combustion, that is, the combustion by the conventional combustion method, is performed. Note that in FIG. 8, the abscissa L shows the amount of depression of the accelerator pedal 40, that is, the required load, and the ordinate N shows the engine rotational speed. Further, in FIG. 8, X(N) shows a first boundary between the first operating region I and the second operating region II, while Y(N) shows a second boundary between the first operating region I and the second operating region II. The change of the operating region from the first operating region I to the second operating region II is judged based on the first boundary X(N), while the change of the operating region from the second operating region II to the first operating region I is judged based on the second boundary Y(N).

That is, when the engine is operating in the first operating region I and first combustion, that is, low temperature combustion, is being performed, if the required load L exceeds the first boundary X(N), which is a function of the engine rotational speed N, it is judged that the operating region has shifted to the second operating region II and second combustion is switched to. Next, when the required load L becomes lower than the second boundary Y(N), which is a function of the engine rotational speed N, it is judged that the operating region has shifted to the first operating region and the second combustion is switched to the first combustion.

The two boundaries, that is, the first boundary X(N) and the second boundary Y(N) at the lower load side from the first boundary X(N), are provided for the following two reasons. The first reason is that at the high load side of the second operating region II, the combustion temperature is relatively high and even if the required load L becomes lower than the first boundary X(N) at that time, low temperature combustion cannot be performed immediately. That is, unless the required load L becomes considerably low, that is, becomes lower than the second boundary Y(N), low temperature combustion cannot be started immediately. The second reason is to provide hysteresis with respect to the change of the operating regions between the first operating region I and the second operating region II.

When the engine is operating in the first operating region I and low temperature combustion is being performed, however, almost no soot is produced, but instead the unburnt hydrocarbons are exhausted from the combustion chamber 5 in the form of a soot precursor or a state before that. At this time, the unburnt hydrocarbons exhausted from the combustion chamber 5 may be oxidized by the catalyst 21 having the oxidation function.

As the catalyst 21, an oxidation catalyst, three-way catalyst, or NOx absorbent may be used. An NOx absorbent has the function of absorbing the NOx when the average air-fuel ratio in the combustion chamber 5 is lean and releasing the NOx when the average air-fuel ratio in the combustion chamber 5 becomes rich.

The NOx absorbent is for example comprised of alumina as a carrier and, on the carrier, for example, at least one of potassium K, sodium Na, lithium Li, cesium Cs, and other alkali metals, barium Ba, calcium Ca, and other alkali earths, lanthanum La, yttrium Y, and other rare earths plus platinum Pt or another precious metal is carried.

The oxidation catalyst, of course, and also the three-way catalyst and NOx absorbent have an oxidation function, therefore the three-way catalyst and NOx absorbent can be used as the catalyst 21 as explained above.

Figure 9:
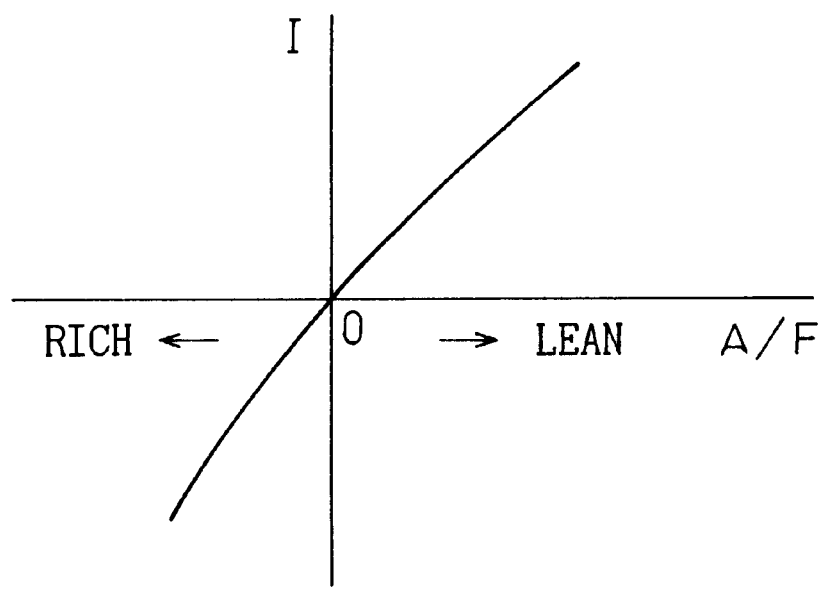
FIG. 9 is a view of the output of the air-fuel ratio sensor.

FIG. 9 shows the output of the air-fuel ratio sensor 23. As shown in FIG. 9, the output current I of the air-fuel ratio sensor 23 changes in accordance with the air-fuel ratio A/F. Therefore, it is possible to determine the air-fuel ratio from the output current I of the air-fuel ratio sensor 23.

Next, an explanation will be given of a detailed example of the control of the operation in the first operating region I and the second operating region II with reference to FIG. 10.

Figure 10:
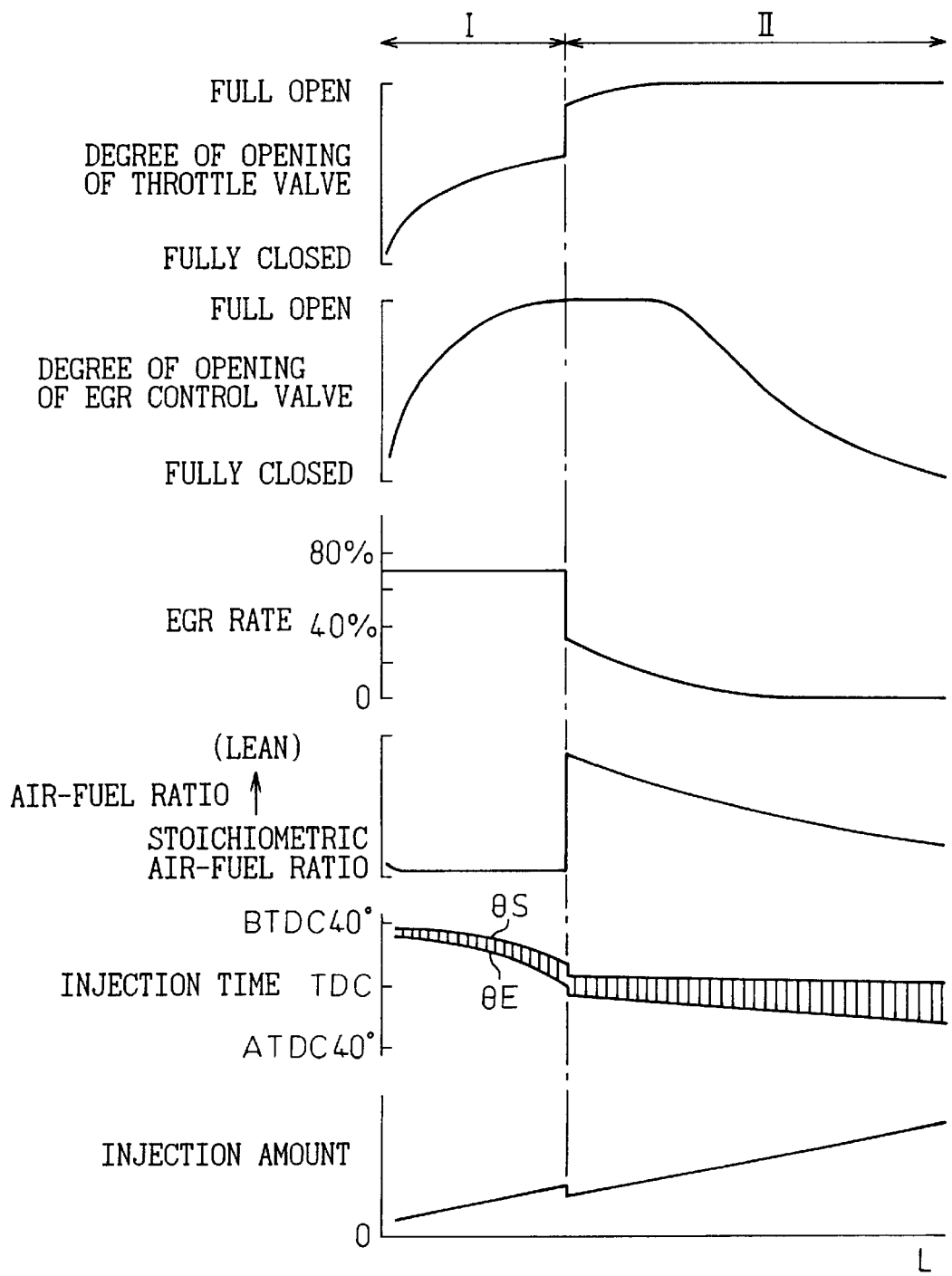
FIG. 10 is a view of the opening degree of a throttle valve etc.

FIG. 10 shows the opening degree of the throttle valve 18, the opening degree of the EGR control valve 25, the EGR rate, the air-fuel ratio, the injection timing, and the amount of injection with respect to the required load L. As shown in FIG. 10, in the first operating region I with the low required load L, the opening degree of the throttle valve 18 is gradually increased from close to the fully closed state to the half opened state as the required load L becomes higher, while the opening degree of the EGR control valve 25 is gradually increased from close to the fully closed state to the fully opened state as the required load L becomes higher. Further, in the example shown in FIG. 10, in the first operating region I, the EGR rate is made about 70 percent and the air-fuel ratio is made a lean air-fuel ratio from 15 to 18.

In other words, in the first operating region I, the opening degree of the throttle valve 18 and the opening degree of the EGR control valve 25 are controlled so that the EGR rate becomes about 70 percent and the air-fuel ratio becomes a lean air-fuel ratio of 15 to 18. Note that at this time, the air-fuel ratio is controlled to the target lean air-fuel ratio by correcting the opening degree of the throttle valve 18, the opening degree of the EGR control valve 25, or the fuel injection amount based on the output signal of the air-fuel ratio sensor 23. Further, in the first operating region I, the fuel is injected before top dead center of the compression stroke TDC. In this case, the injection start timing θS becomes later the higher the required load L. The injection end timing θE also becomes later the later the injection start timing θS.

As mentioned above, during idling operation, the throttle valve 18 is made to close to close to the fully closed state. At this time, the EGR control valve 25 is also made to close to close to the fully closed state. If the throttle valve 18 closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 18 can be closed to close to the fully closed state to suppress vibration in the engine body 1.

When the engine is operating in the first operating region I, almost no soot or NOx is produced and hydrocarbons in the form of a soot precursor or its previous state contained in the exhaust gas can be oxidized by the catalyst 21.

On the other hand, in the second operating region II, the second combustion, that is, the conventionally performed combustion, is performed. In the second operating region II, the throttle valve 18 is except in some cases held in the fully opened state and the opening degree of the EGR control valve 25 is made smaller the higher the required load L. Therefore, the EGR rate becomes lower the higher the required load L and the air-fuel ratio becomes smaller the higher the required load L. Even if the required load L becomes high, however, the air-fuel ratio is made a lean air-fuel ratio. Further, in the second combustion, some soot and NOx are produced, but the heat efficiency is higher than with low temperature combustion and therefore at the boundary of the first operating region I and the second operating region II, the amount of injection at the second operating region II becomes smaller than the amount of injection in the first operating region. Further, in the second operating region II, the injection start timing θS is made close to the top dead center of the compression stroke TDC.

As mentioned above, however, when switching from the first combustion to the second combustion or from the second combustion to the first combustion, it is necessary to change the EGR rate instantaneously so as to jump over the range of EGR rate from about 40 percent to about 65 percent where a large amount of smoke is produced so as to prevent the production of a large amount of smoke. In this embodiment of the present invention, however, the EGR rate is made to change so as to make the opening degree of the throttle valve change as shown in FIG. 10. If the EGR rate is made to change by making the opening degree of the throttle valve change in this way, however, it is not possible to make the EGR rate change instantaneously.

That is, first, it is not possible to make the opening degree of the throttle valve change instantaneously. Second, the amount of the EGR gas supplied in the surge tank 12 changes a little while after the opening degree of the throttle valve changes and thereby the pressure in the surge tank 12 changes. Therefore, some time is required until the EGR rate in the combustion chamber 5 changes from after the opening degree of the throttle valve changes. Therefore, as explained above, it is not possible to make the EGR rate change instantaneously by making the opening degree of the throttle valve change in the above-mentioned way. The same applies in the case of trying to make the EGR rate change by making the opening degree of the EGR control valve change.

Therefore, in the first embodiment of the present invention, when switching from the first combustion to the second combustion or from the second combustion to the first combustion, the amount of fuel injection is reduced to the minimum injection amount required for operation of the engine for a while, for example, to the injection amount necessary for idling operation, and the electric motor 32 is driven at that time to make the electric motor 32 generate an output torque substantially equivalent to the amount of reduction of the output torque of the engine due to the reduction of the amount of injection.

Figure 11:
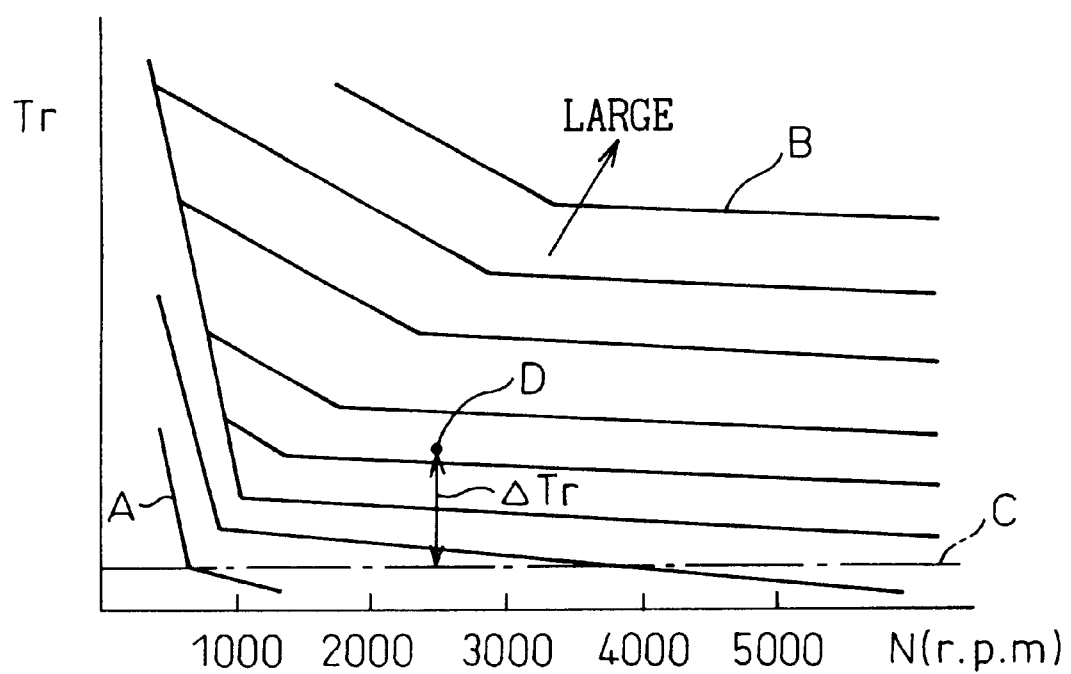
FIG. 11 is a view of the output torque of the engine.

The ordinate Tr in FIG. 11 shows the output torque of the engine, while the abscissa N shows the engine rotational speed. The solid lines show the relationship between the engine output torque Tr and the engine rotational speed N at the same amount of depression of the accelerator pedal 50. Further, the solid line A in FIG. 11 shows the case when the amount of depression of the accelerator pedal 50 is zero, while the solid line B shows the case when the amount of depression of the accelerator pedal 50 is maximum. The amount of depression of the accelerator pedal 50 increases from the solid line A to the solid line B.

In FIG. 11, the broken line C shows the output torque of the engine when the amount of fuel injection is made the injection amount required for idling operation. If the amount of fuel injection is made to be reduced to the amount of injection required for idling operation, even if the EGR rate becomes from 40 percent to 60 percent, the amount of soot generated will become considerably small. Therefore, when switching from the first combustion to the second combustion or from the second combustion to the first combustion, if the amount of fuel injection is temporarily made to be reduced to injection amount required for idling operation, the amount of soot generated becomes considerably small.

On the other hand, the second combustion is performed at the point D of FIG. 11. In this state, if the amount of fuel injection for switching to the first combustion is switched to the injection amount required for idling operation, the output torque Tr of the engine is made to be reduced by $\Delta$Tr in FIG. 11. At this time, in the first embodiment, the electric motor 32 driven so as to generate the output torque $\Delta$Tr, therefore the output torque generated at the output shaft 31 does not change.

Figure 12:
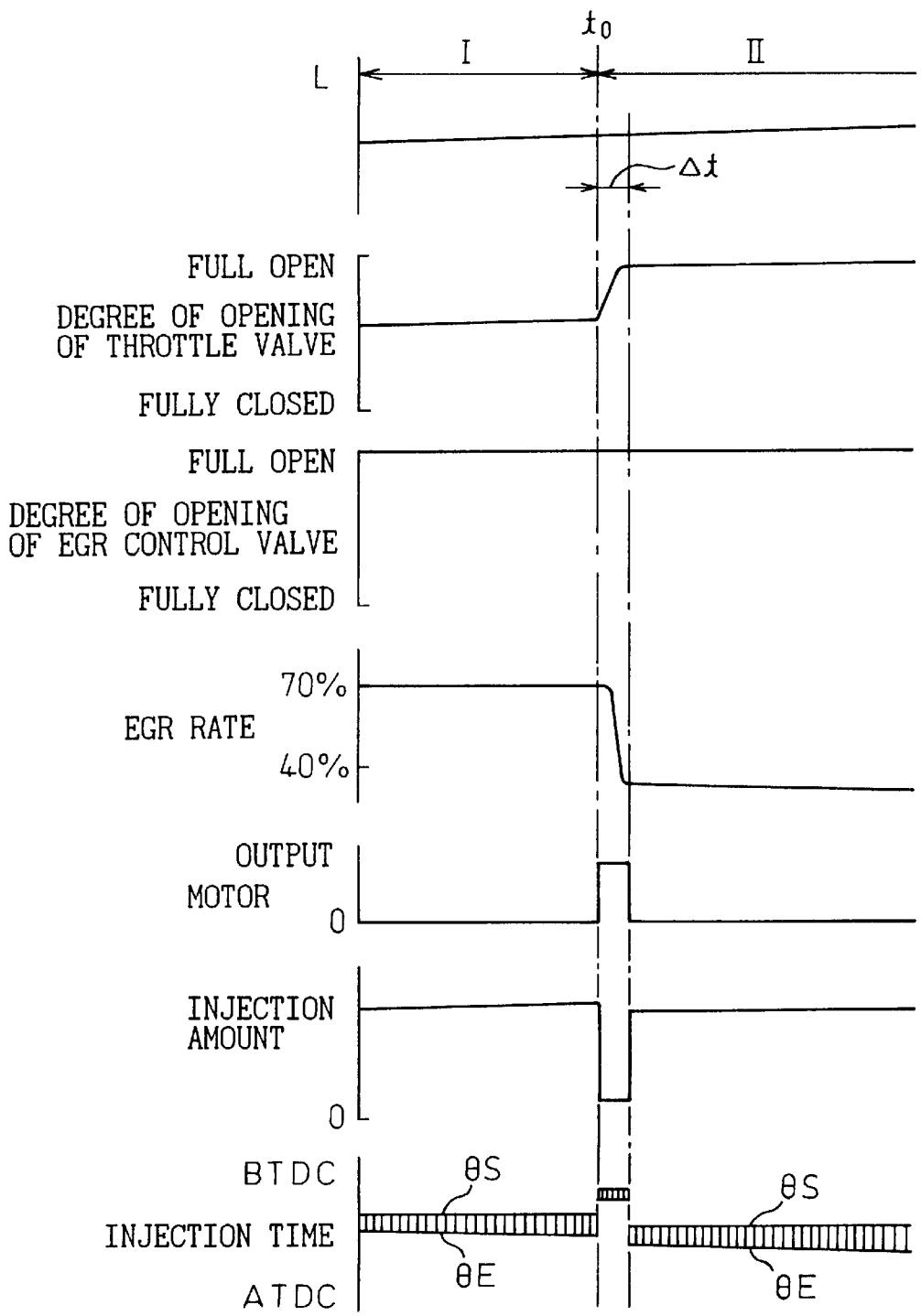
FIGS. 12 and 13 are time charts for explaining the control of an electric motor and injection amount etc. in a first embodiment.

FIG. 12 shows the case when the engine operating state switches from the first operating region I to the second operating region II. If the amount of depression L of the accelerator pedal 50 exceeds the first boundary X(N) at the time $t_0$ of FIG. 12, a signal for making the opening degree of the throttle valve a target opening degree predetermined for the second operating region II is given to the electric motor 17. Further, at this time, the injection amount is reduced to the injection amount required for idling operation, the electric motor 32 is driven so as to generate an output torque substantially equal to the amount of reduction of the engine output torque, and the fuel injection timing is made earlier.

When a signal for making the opening degree of the throttle valve a target opening degree predetermined for the second operating region II is given to the electric motor 17, the opening degree of the throttle valve increases and the EGR rate is made to be reduced from about 70 percent to about 40 percent. During this time, the EGR rate temporarily becomes between 40 percent to 60 percent, but at this time the amount of fuel injection is small, so the amount of soot generated becomes considerably small.

When a certain time $\Delta t$ elapses from the time $t_0$, the EGR rate is made the target EGR rate at the second operating region II. At this time, the injection amount and the injection timing are made the target injection amount and target injection timing in the second operating region II, respectively, and the supply of power for driving the electric motor 32 is stopped.

Figure 13:
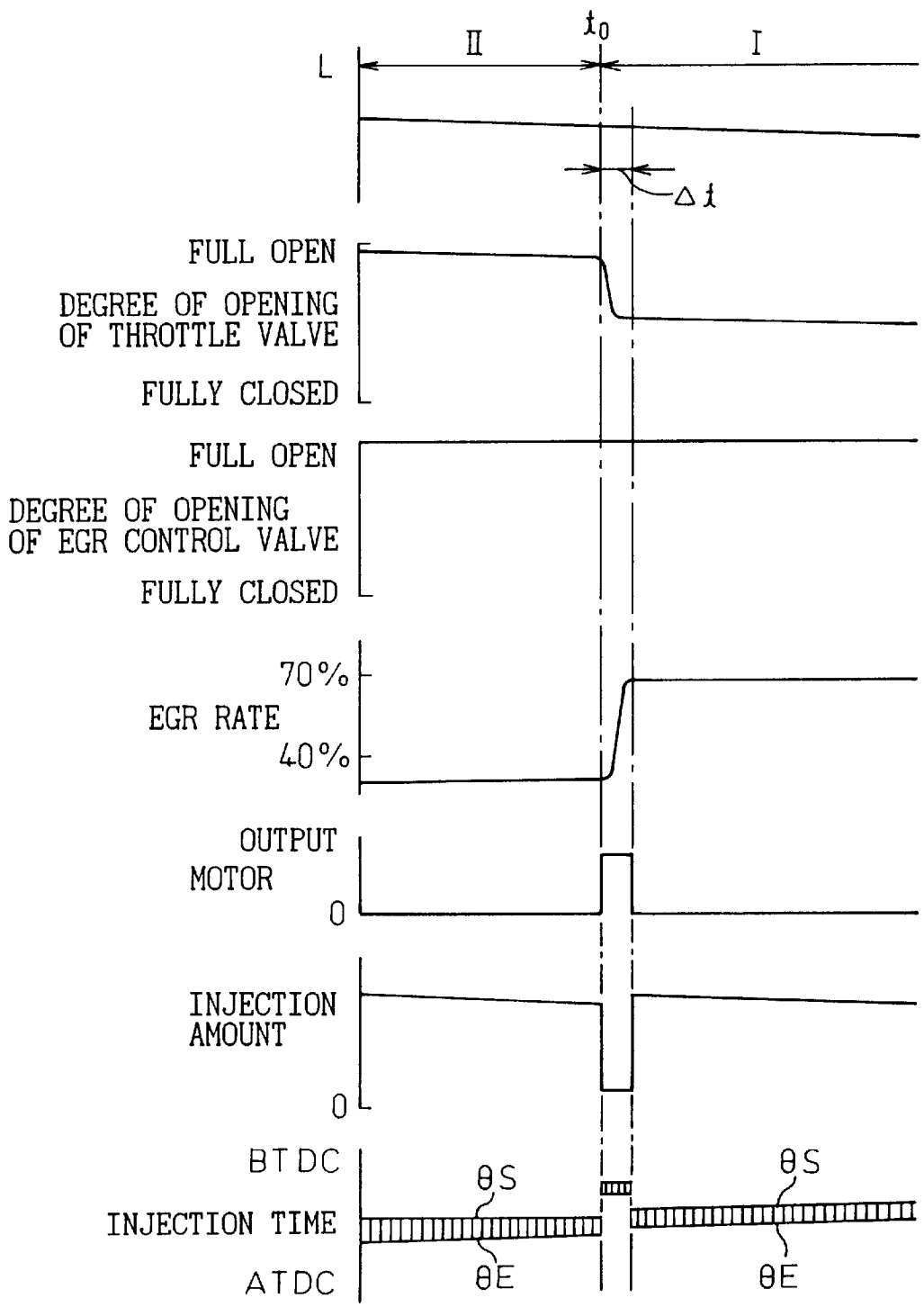

FIG. 13 shows the case when the engine operating state is switched from the second operating region II to the first operating region I. If it is assumed that the amount of depression L of the accelerator pedal 50 becomes smaller than the second boundary Y(N) at the time $t_0$ of FIG. 13, a signal for making the opening degree of the throttle valve the target opening degree predetermined for the first operating region is given to the electric motor 17. Further, at this time, the injection amount is reduced to the injection amount required for idling operation, the electric motor 32 is driven to generate an output torque substantially equal to the amount of reduction of the engine output torque, and the fuel injection timing is made earlier.

If a signal for making the opening degree of the throttle valve a target opening degree predetermined for the first operating region I is given to the electric motor 17, the opening degree of the throttle valve is reduced and the EGR rate is made to be increased from under 40 percent to about 70 percent. During this time, the EGR rate temporarily becomes between 40 percent to 70 percent, but the amount of fuel injection at that time is small, so the amount of soot produced becomes considerably small.

When a certain time $\Delta t$ elapses from the time to, the EGR rate is made the target EGR rate at the first operating region I. At this time, the injection amount and the injection timing are made the target injection amount and target injection timing in the first operating region I, respectively, and the supply of power for driving the electric motor 32 is stopped.

Figure 14:
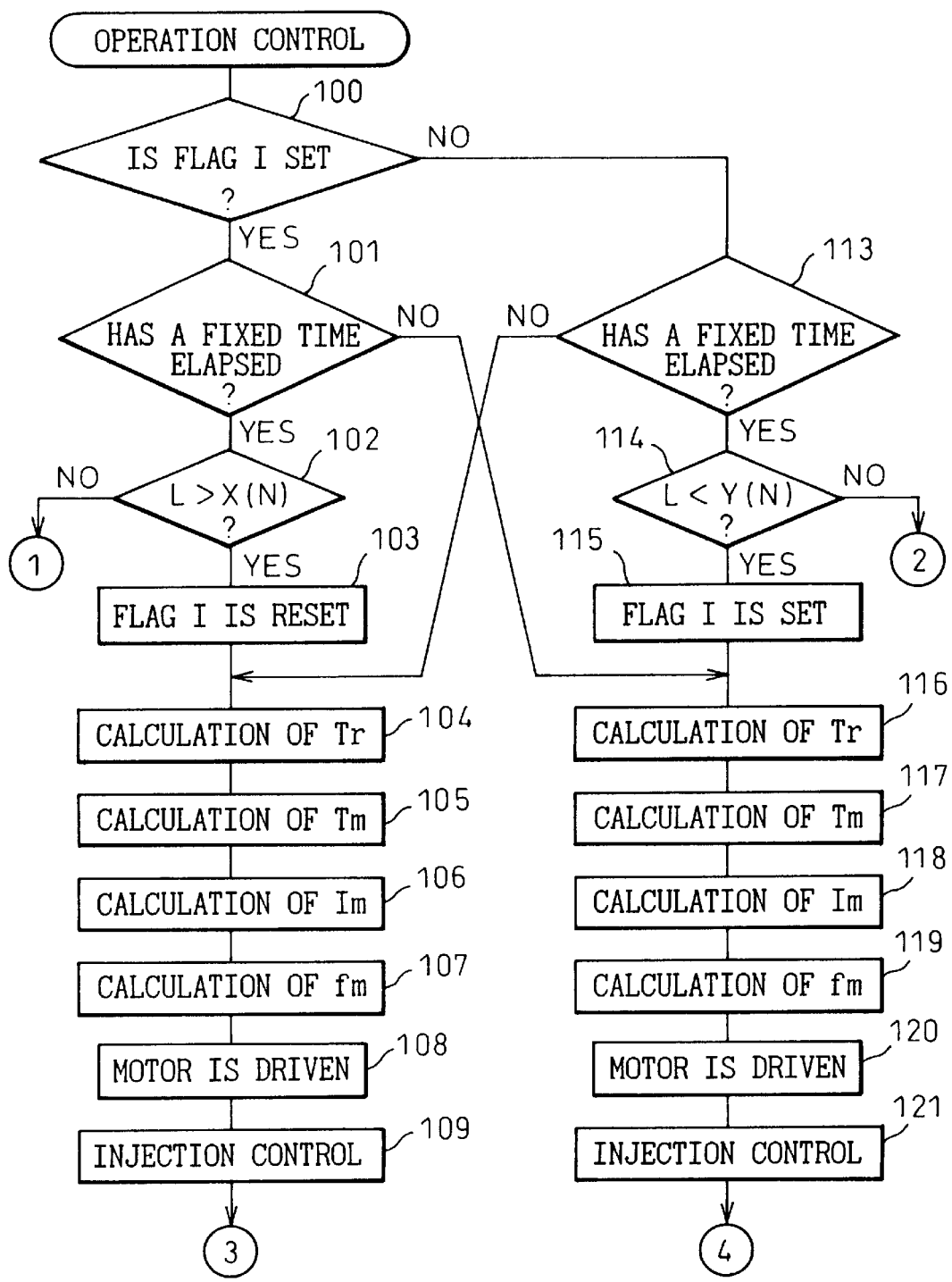
FIGS. 14 and 15 are flow charts of routine for the control of the operation in the first embodiment.
Figure 15:
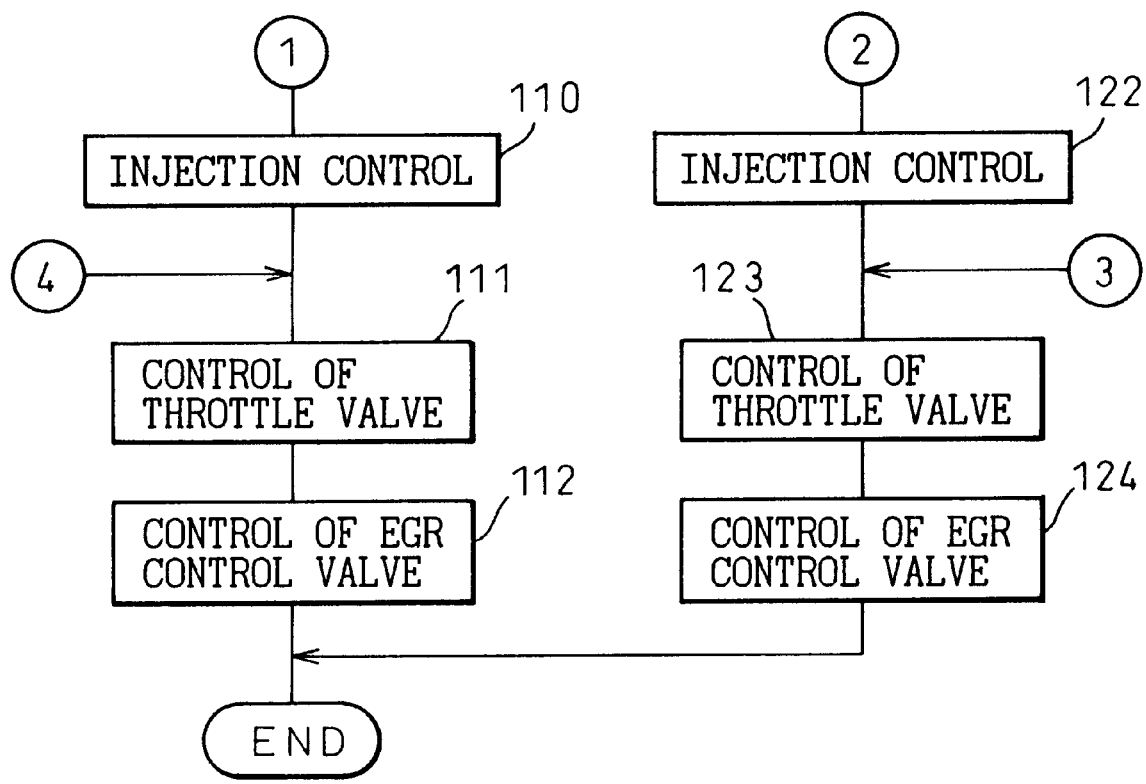

FIG. 14 and FIG. 15 show a routine for the control of the operation for working the first embodiment.

Referring to FIG. 14 and 15, first, at step 100, it is judged if a flag I showing that the engine is operating in the first operating region I has been set or not. When the flag I has been set, that is, when the engine is operating in the first operating region I, the routine proceeds to step 101, where it is judged if a certain time $\Delta t$ (FIG. 13) has elapsed from when the flag I was set or not. When the certain time $\Delta t$ has elapsed from when the flag I was set, the routine proceeds to step 102, wherein it is judged if the required load L has become larger than the first boundary X(N) shown in FIG. 8 or not.

When L$\leq$X(N), the routine proceeds to step 110, where the injection amount, injection start timing $\theta$S, and injection completion timing $\theta$E corresponding to the required load L shown in the first operating region I of FIG. 10 are found and fuel is injected based on these. Next, at step 111, the opening degree of the throttle valve 18 is controlled to an opening degree in accordance with the required load L shown in the first operating region I of FIG. 10. Next, at step 112, the opening degree of the EGR control valve 25 is controlled to an opening degree in accordance with the required load L shown in the first operating region I of FIG. 10. Therefore, at this time, the first combustion is performed.

On the other hand, when it is judged at step 102 that L>X(N), the routine proceeds to step 103, where the flag I is reset. Next, at step 104, the current engine output torque Tr is calculated from the relationship shown in FIG. 11 based on the amount of depression L of the accelerator pedal 50 and the engine rotational speed N. Next, at step 105, the amount of reduction $\Delta$Tr of the engine output torque when reducing the amount of fuel injection to the injection amount at the time of idling operation is made the output torque Tm to be generated by the electric motor 32.

Next, at step 106, the current value Im of the three-phase alternating current to be supplied to the electric motor 32 for the electric motor 32 to generate the output torque Tm is calculated. Next, at step 107, the frequency fm of the three-phase alternating current to be supplied to the electric motor 32 is calculated based on the engine rotational speed N. Next, at step 108, a three-phase alternating current of a current value Im and a frequency fm is supplied to the electric motor 32, whereby the electric motor 32 is driven. Next, at step 109, the amount of fuel injection is made the injection amount at the time of idling operation and the injection timing is advanced.

Next, at step 123, the opening degree of the throttle valve 18 is controlled to the opening degree in accordance with the required load L shown in the second operating region II of FIG. 10. That is, the throttle valve 18 is made to open. Next, at step 124, the opening degree of the EGR control valve 25 is controlled to the opening degree in accordance with the required load L shown in the second operating region II of FIG. 10.

When the flag I is reset, the routine proceeds from step 100 to step 113, where it is judged if a certain time $\Delta t$ (FIG. 12) has elapsed from when the flag I was reset or not. When the certain time $\Delta t$ has not elapsed from when the flag I was reset, the routine proceeds to step 104. Therefore, it will be understood, when the flag I is reset, the electric motor 32 is driven for the certain time $\Delta t$ and the amount of fuel injection is made to be reduced for that period.

On the other hand, when the certain time $\Delta t$ has elapsed from when the flag I was reset, the routine proceeds to step 114, where it is judged if the required load L has become smaller than the second boundary Y(N) shown in FIG. 8. When $L \geq Y(N)$, the routine jumps to step 122, where the injection amount, injection start timing $\theta S$, and injection completion timing $\theta E$ corresponding to the required load L shown in the second operating region II of FIG. 10 are found and fuel is injected based on these. Next, the routine proceeds to step 123. Therefore, at this time, the second combustion is performed.

Next, when it is judged at step 114 that L<Y(N), the routine proceeds to step 115, where the flag I is set. Next, at step 116, the current engine output torque Tr is calculated from the relationship shown in FIG. 11 based on the amount of depression L of the accelerator pedal 50 and the engine rotational speed N. Next, at step 117, the amount of reduction $\Delta Tr$ of the engine output torque when reducing the amount of fuel injection to the injection amount at the time of idling operation is made the output torque Tm to be generated by the electric motor 32.

Next, at step 118, the current value Im of the three-phase alternating current to be supplied to the electric motor 32 for the electric motor 32 to generate the output torque Tm is calculated. Next, at step 119, the frequency fm of the three-phase alternating current to be supplied to the electric motor 32 is calculated based on the engine rotational speed N. Next, at step 120, a three-phase alternating current of a current value Im and a frequency fm is supplied to the electric motor 32, whereby the electric motor 32 is driven. Next, at step 121, the amount of fuel injection is made the injection amount at the time of idling operation and the injection timing is advanced.

Next, at step 111, the opening degree of the throttle valve 18 is controlled to the opening degree in accordance with the required load L shown in the first operating region I of FIG. 10. That is, the throttle valve 18 is made to turn in the closing direction. Next, at step 112, the opening degree of the EGR control valve 25 is controlled to the opening degree in accordance with the required load L shown in the first operating region I of FIG. 10.

When the flag I is set, as explained above, the routine proceeds from step 100 to step 101, where it is judged if a certain time $\Delta t$ (FIG. 13) has elapsed from when the flag I was set or not. When the certain time $\Delta t$ has not elapsed from when the flag I was set, the routine proceeds to step 116. Therefore, it will be understood, when the flag I is set, the electric motor 32 is driven for the certain time $\Delta t$ and the amount of fuel injection is made to be reduced for that period.

On the other hand, when the certain time $\Delta t$ has elapsed from when the flag I was set, the routine proceeds to step 102, while when $L \leq X(N)$, the routine proceeds to step 110, where the first combustion is performed.

FIG. 16 to FIG. 19 show a second embodiment.

Figure 16:
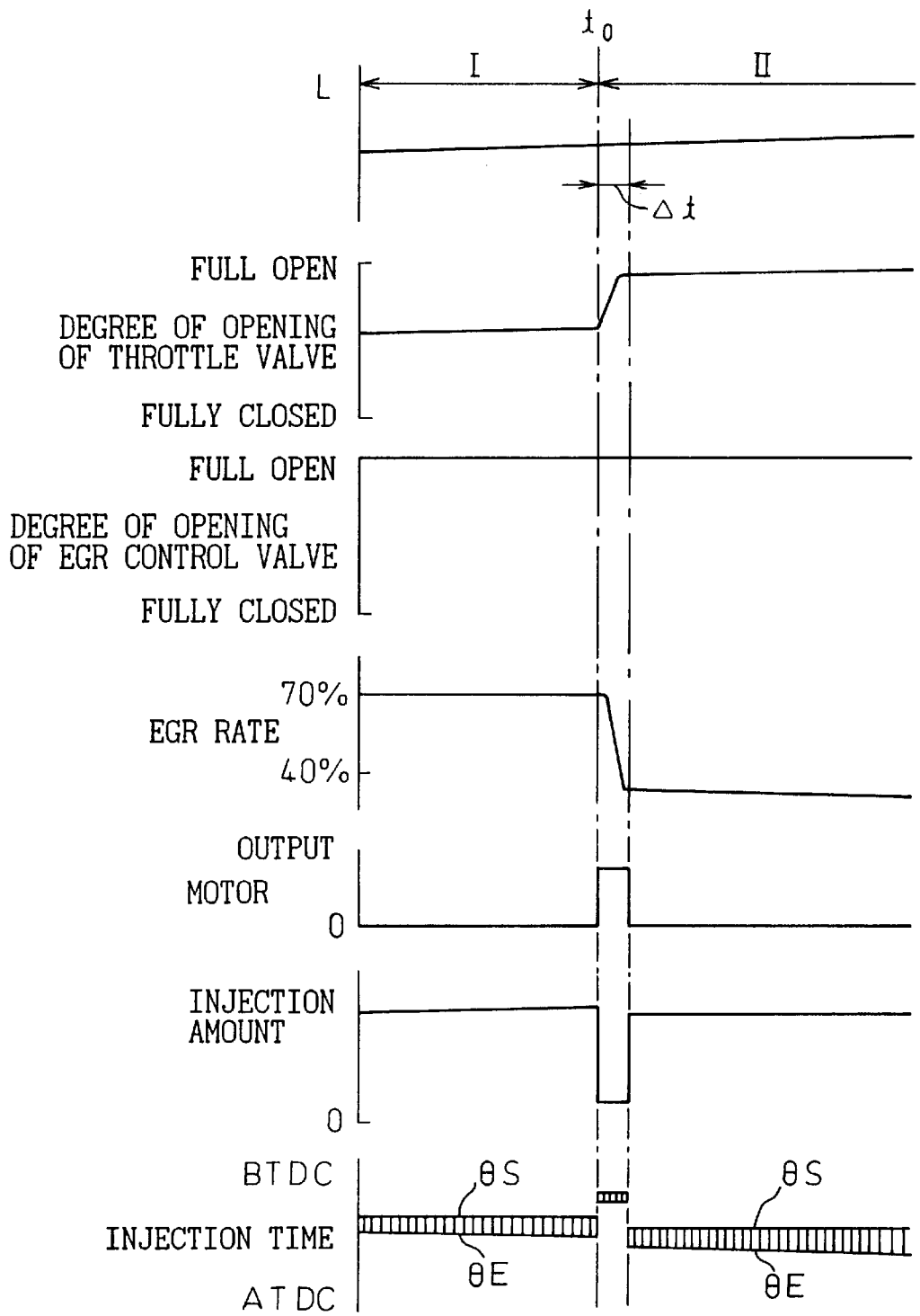
FIGS. 16 and 17 are time charts for explaining the control of an electric motor and injection amount etc. in a second embodiment.

FIG. 16 shows the case where the engine operating state is switched from the first operating region I to the second operating region II. At this time, the same operational control is performed as in the first embodiment shown in FIG. 12. That is, when the amount of depression L of the accelerator pedal 50 exceeds the first boundary X(N) at the time $t_0$ of FIG. 16, an electric signal for making the opening degree of the throttle valve the target opening degree predetermined for the second operating region II is given to the electric motor 17. Further, at this time, the injection amount is reduced to the injection amount required for the idling operation, the electric motor 32 is driven so as to produce an output torque substantially equivalent to the amount of reduction of the engine output torque, and the fuel injection timing is advanced.

When a signal for making the opening degree of the throttle valve a target opening degree predetermined for the second operating region II is given to the electric motor 17, the opening degree of the throttle valve increases and the EGR rate is made to be reduced from about 70 percent to about 40 percent. During this time, the EGR rate temporarily becomes between 40 percent to 60 percent, but at this time the amount of fuel injection is small, so the amount of soot generated becomes considerably small.

When a certain time $\Delta t$ elapses from the time $t_0$, the EGR rate is made the target EGR rate at the second operating region II. At this time, the injection amount and the injection timing are made the target injection amount and target injection timing in the second operating region II, respectively, and the supply of power for driving the electric motor 32 is stopped.

Figure 17:
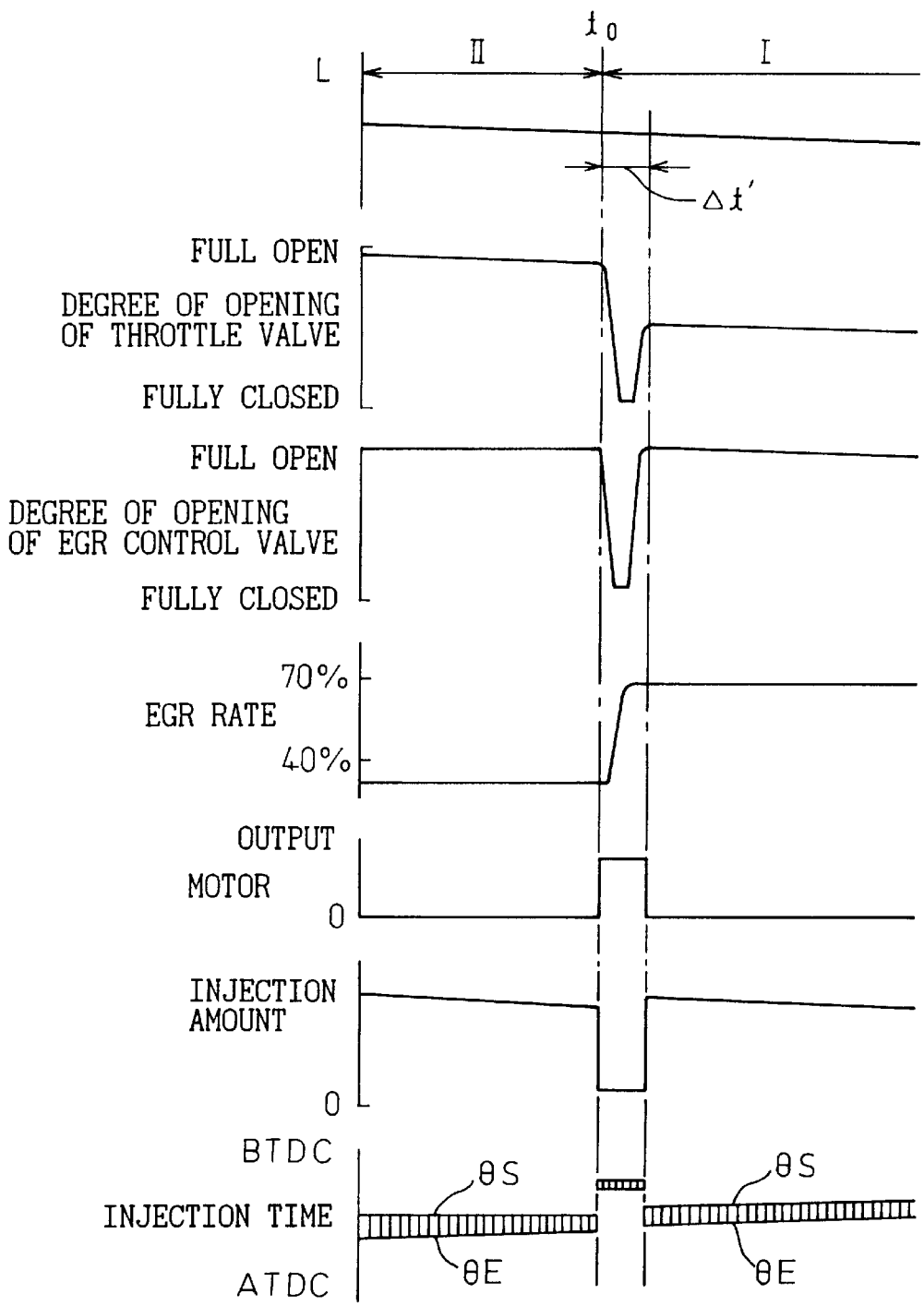

On the other hand, FIG. 17 shows the case when the engine operating state is switched from the second operating region II to the first operating region I. If it is assumed that the amount of depression L of the accelerator pedal 50 becomes smaller than the second boundary Y(N) at the time $t_0$ of FIG. 17, a signal for making the opening degree of the throttle valve the target opening degree predetermined for the first operating region is given to the electric motor 17 and a signal for making the opening degree of the EGR control valve a target opening degree of the time of idling operation in the first operating region I is given to the EGR control valve 25. Further, at this time, the injection amount is reduced to the injection amount required for idling operation, the electric motor 32 is driven to generate an output torque substantially equal to the amount of reduction of the engine output torque, and the fuel injection timing is made earlier.

If the opening degree of the throttle valve and the opening degree of the EGR control valve are made to be reduced to the target opening degrees of the time of idling operation, the pressure in the combustion chamber 5 at the end of the compression stroke will become lower, so the gas temperature in the combustion chamber 5 will also become lower and therefore the first combustion, that is, the low temperature combustion, will immediately be started. Next, the opening degree of the throttle valve and the opening degree of the EGR control valve are made to increase to the target opening degrees in the first operating region I. Next, when the opening degree of the throttle valve and the opening degree of the EGR control valve become the target opening degrees in the first operating region I, that is, when the certain time Δt' has elapsed from the time $t_0$, the injection amount and the injection timing are made the target injection amount and target injection timing in the first operating region I and the supply of power for driving the electric motor 32 is stopped.

Figure 18:
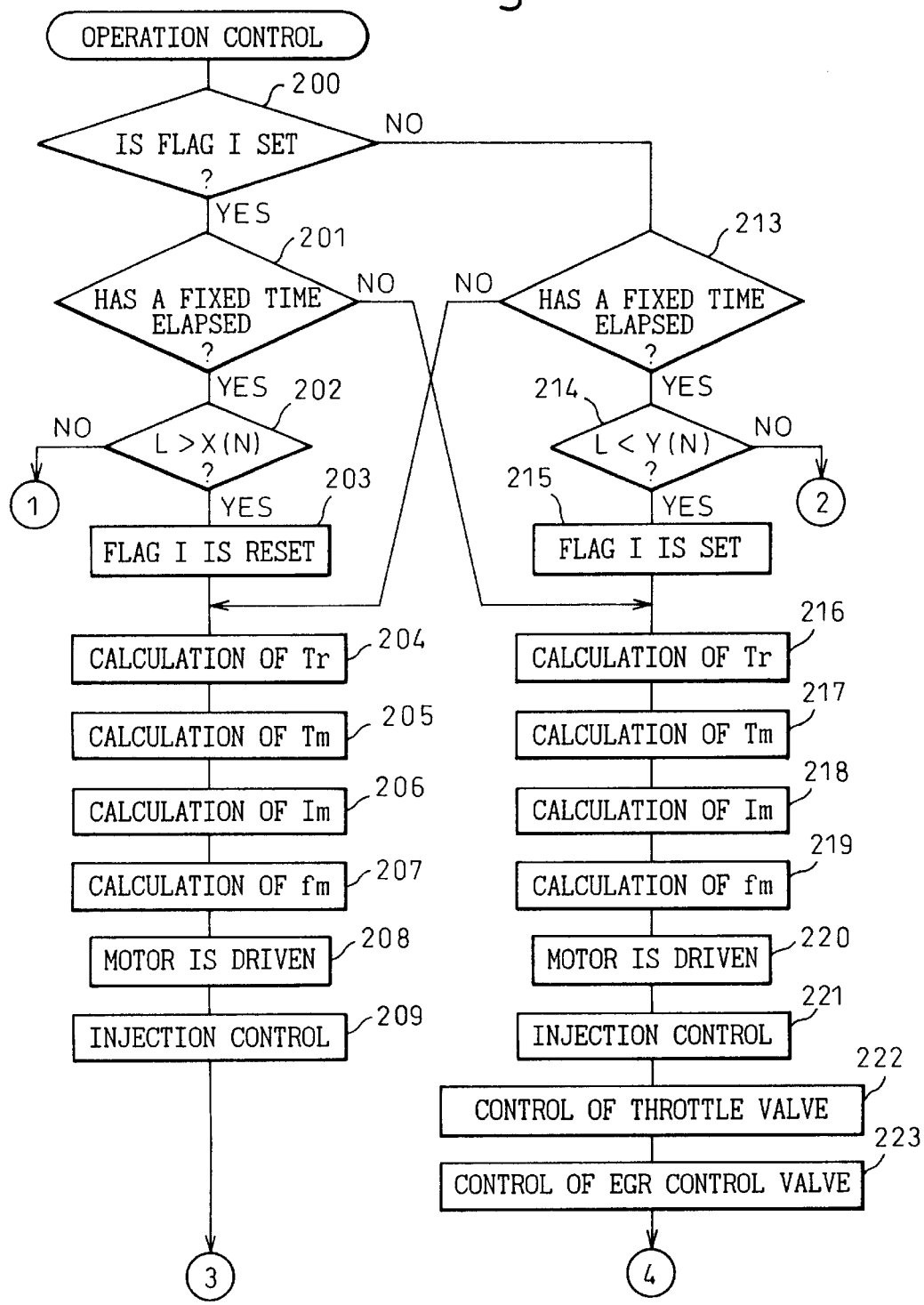
FIGS. 18 and 19 are flow charts of routine for the control of the operation in the second embodiment.
Figure 19:
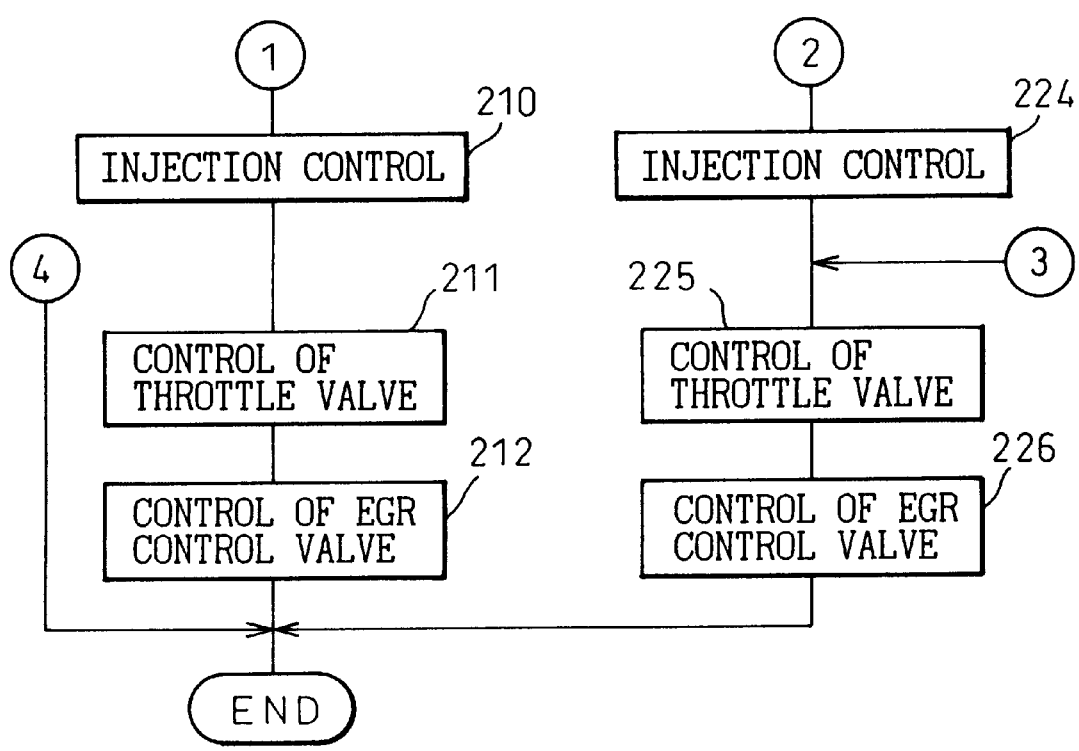

FIG. 18 and FIG. 19 show a routine for the control of the operation for working the second embodiment.

Referring to FIG. 18 and 19, first, at step 200, it is judged if a flag I showing that the engine is operating in the first operating region I has been set or not. When the flag I has been set, that is, when the engine is operating in the first operating region I, the routine proceeds to step 201, where it is judged if a certain time Δt' (FIG. 17) has elapsed from when the flag I was set or not. When the certain time Δt' has elapsed from when the flag I was set, the routine proceeds to step 202, wherein it is judged if the required load L has become larger than the first boundary X(N) shown in FIG. 8 or not.

When L≦X(N), the routine proceeds to step 210, where the injection amount, injection start timing θS, and injection completion timing θE corresponding to the required load L shown in the first operating region I of FIG. 10 are found and fuel is injected based on these. Next, at step 211, the opening degree of the throttle valve 18 is controlled to an opening degree in accordance with the required load L shown in the first operating region I of FIG. 10. Next, at step 212, the opening degree of the EGR control valve 25 is controlled to an opening degree in accordance with the required load L shown in the first operating region I of FIG. 10. Therefore, at this time, the first combustion is performed.

On the other hand, when it is judged at step 202 that L>X(N), the routine proceeds to step 203, where the flag I is reset. Next, at step 204, the current engine output torque Tr is calculated from the relationship shown in FIG. 11 based on the amount of depression L of the accelerator pedal 50 and the engine rotational speed N. Next, at step 205, the amount of reduction ΔTr of the engine output torque when reducing the amount of fuel injection to the injection amount at the time of idling operation is made the output torque Tm to be generated by the electric motor 32.

Next, at step 206, the current value Im of the three-phase alternating current to be supplied to the electric motor 32 for the electric motor 32 to generate the output torque Tm is calculated. Next, at step 207, the frequency fm of the three-phase alternating current to be supplied to the electric motor 32 is calculated based on the engine rotational speed N. Next, at step 208, a three-phase alternating current of a current value In and a frequency fm is supplied to the electric motor 32, whereby the electric motor 32 is driven. Next, at step 209, the amount of fuel injection is made the injection amount at the time of idling operation and the injection timing is advanced.

Next, at step 225, the opening degree of the throttle valve 18 is controlled to the opening degree in accordance with the required load L shown in the second operating region II of FIG. 10. That is, the throttle valve 18 is made to open. Next, at step 226, the opening degree of the EGR control valve 25 is controlled to the opening degree in accordance with the required load L shown in the second operating region II of FIG. 10.

When the flag I is reset, the routine proceeds from step 200 to step 213, where it is judged if a certain time Δt (FIG. 16) has elapsed from when the flag I was reset or not. When the certain time Δt has not elapsed from when the flag I was reset, the routine proceeds to step 204. Therefore, it will be understood, when the flag I is reset, the electric motor 32 is driven for the certain time Δt and the amount of fuel injection is made to be reduced for that period.

On the other hand, when the certain time Δt has elapsed from when the flag I was reset, the routine proceeds to step 214, where it is judged if the required load L has become smaller than the second boundary Y(N) shown in FIG. 8. When L≧Y(N), the routine jumps to step 224, where the injection amount, injection start timing θS, and injection completion timing θE corresponding to the required load L shown in the second operating region II of FIG. 10 are found and fuel is injected based on these. Next, the routine proceeds to step 225. Therefore, at this time, the second combustion is performed.

Next, when it is judged at step 214 that L<Y(N), the routine proceeds to step 215, where the flag I is reset. Next, at step 216, the current engine output torque Tr is calculated from the relationship shown in FIG. 11 based on the amount of depression L of the accelerator pedal 50 and the engine rotational speed N. Next, at step 217, the amount of reduction ΔTr of the engine output torque when reducing the amount of fuel injection to the injection amount at the time of idling operation is made the output torque Tm to be generated by the electric motor 32.

Next, at step 218, the current value Im of the three-phase alternating current to be supplied to the electric motor 32 for the electric motor 32 to generate the output torque Tm is calculated. Next, at step 219, the frequency fm of the three-phase alternating current to be supplied to the electric motor 32 is calculated based on the engine rotational speed N. Next, at step 220, a three-phase alternating current of a current value Im and a frequency fm is supplied to the electric motor 32, whereby the electric motor 32 is driven. Next, at step 221, the amount of fuel injection is made the injection amount at the time of idling operation and the injection timing is advanced.

Next, at step 222, as shown in FIG. 17, the throttle valve 18 is made to close once to the opening degree at the time of idling operation, then is made to open to the opening degree in accordance with the required load L shown in the first operating region I of FIG. 10. Next, at step 223, as shown in FIG. 17, the EGR control valve 25 is made to close once to the opening degree at the time of the idling operation, then is made to open to the opening degree in accordance with the required load L shown in the first operating region I of FIG. 10.

When the flag I is set, as explained above, the routine proceeds from step 200 to step 201, where it is judged if a certain time Δt' (FIG. 17) has elapsed from when the flag I was set or not. When the certain time Δt' has not elapsed from when the flag I was set, the routine proceeds to step 216. Therefore, it will be understood, when the flag I is set, the electric motor 32 is driven for the certain time Δt and the amount of fuel injection is made to be reduced for that period.

On the other hand, when the certain time Δt' has elapsed from when the flag I was set, the routine proceeds to step

202, while when L≦X(N), the routine proceeds to step 210, where the first combustion is performed.

Figure 20:
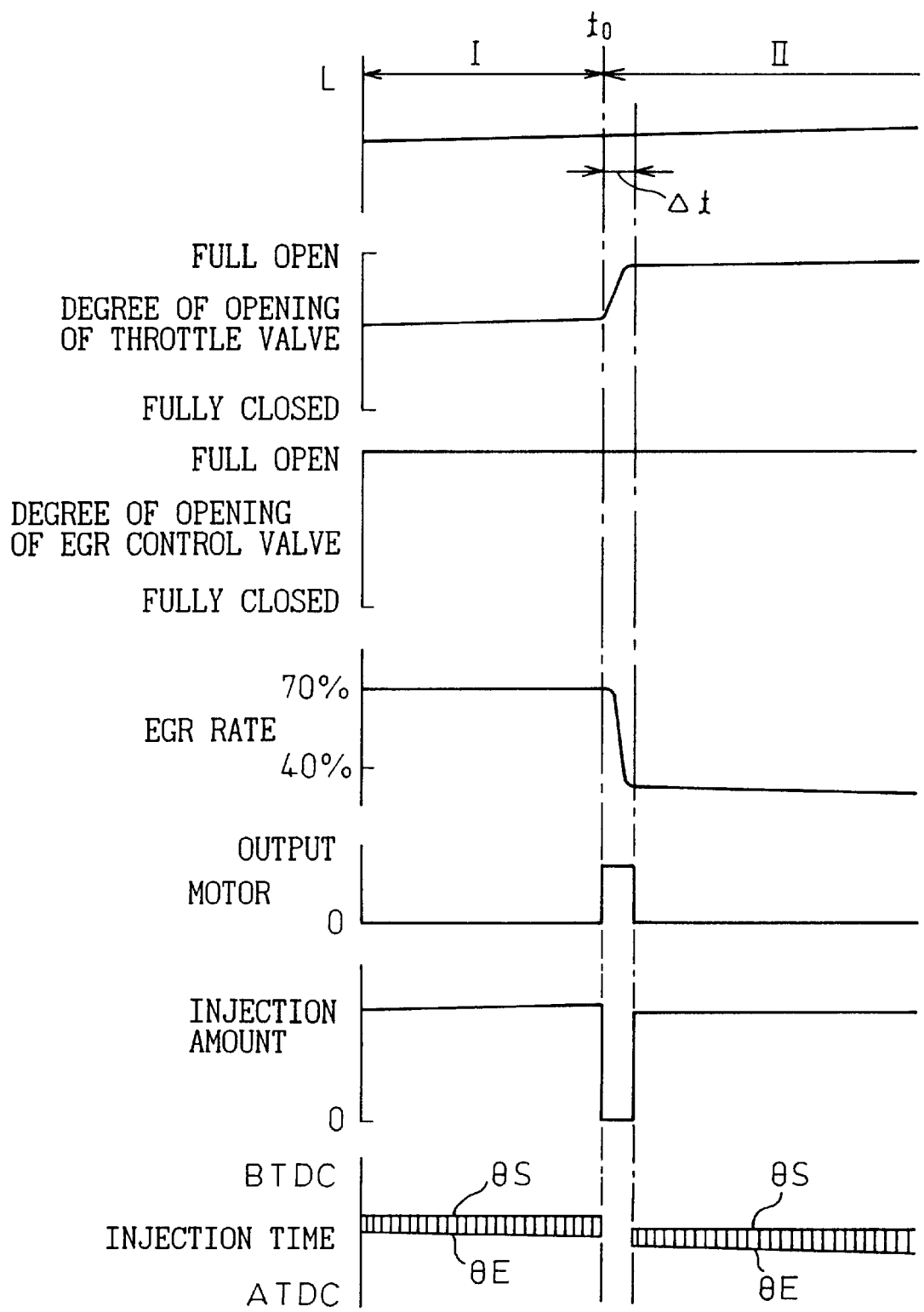
FIGS. 20 and 21 are time charts for explaining the control of an electric motor and injection amount etc. in a third embodiment.

FIG. 20 to FIG. 23 show a third embodiment. Referring to FIG. 20, which shows a case when the engine operating state is switched from the first operating state I to the second operating state II, if it is assumed that the amount of depression L of the accelerator pedal 50 exceeds the first boundary X(N) at the time to, a signal for making the opening degree of the throttle valve the target opening degree predetermined for the second operating region II is given to the electric motor 17. Further, at this time, the fuel injection is stopped and the electric motor 32 is driven to generate an output torque substantially equal to the amount of reduction of the engine output torque.

If a signal for making the opening degree of the throttle valve a target opening degree predetermined for the second operating region II is given to the electric motor 17, the opening degree of the throttle valve is increased and the EGR rate is made to be reduced from about 70 percent to under 40 percent. During this time, the EGR rate temporarily becomes between 40 percent to 60 percent, but since the fuel injection is stopped at that time, no soot is produced at all.

When a certain time Δt elapses from the time $t_0$, the EGR rate is made the target EGR rate at the second operating region II. At this time, the injection amount and the injection timing are made the target injection amount and target injection timing in the second operating region II, respectively, and the supply of power for driving the electric motor 32 is stopped.

Figure 21:
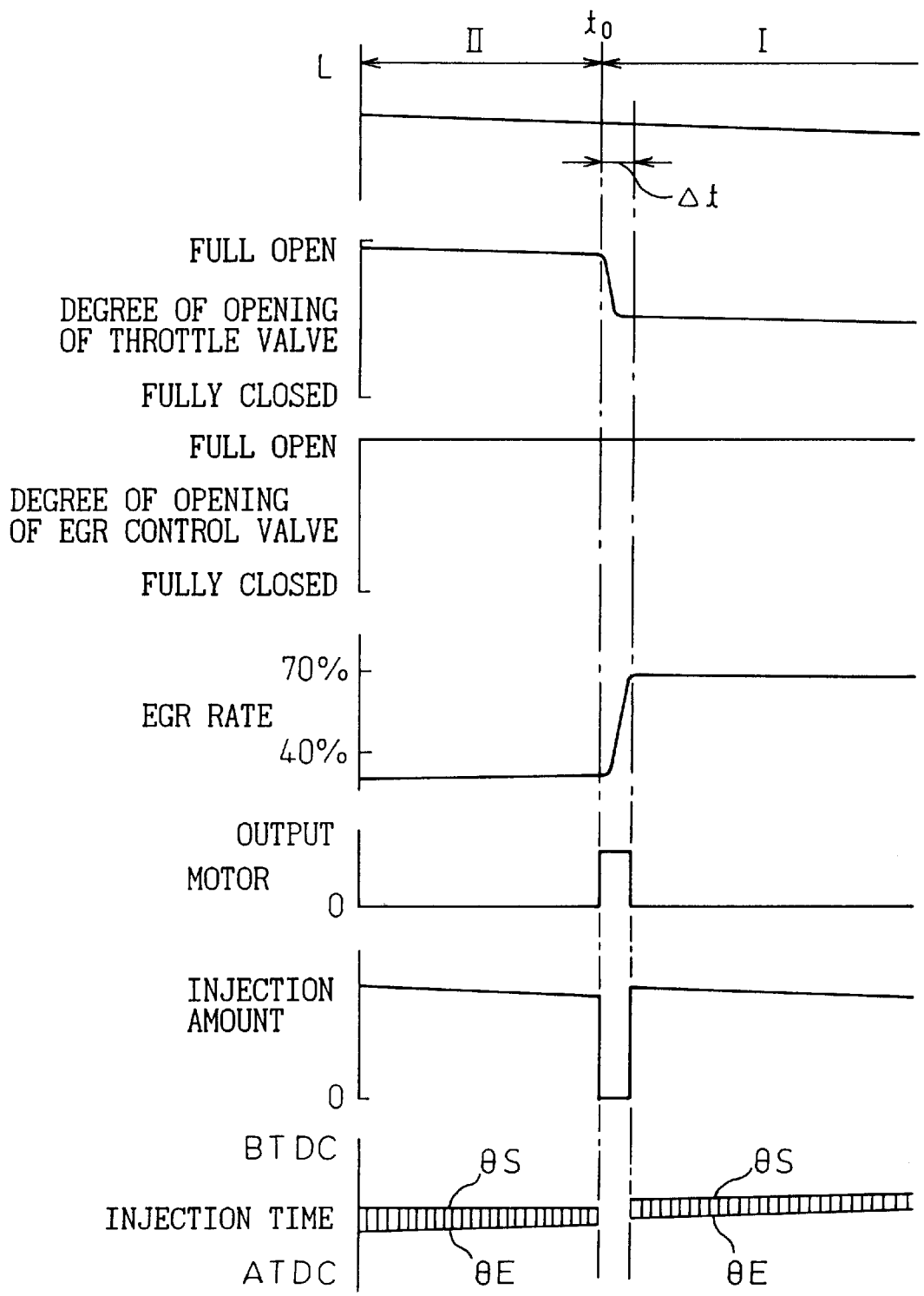

FIG. 21 shows the case where the engine operating state is switched from the second operating region II to the first operating region I. If it is assumed that the amount of depression L of the accelerator pedal 50 becomes smaller than the second boundary Y(N) at the time $t_0$ of FIG. 21, a signal for making the opening degree of the throttle valve the target opening degree predetermined for the first operating region is given to the electric motor 17. Further, at this time, the fuel injection is stopped and the electric motor 32 is driven to generate an output torque substantially equal to the amount of reduction of the engine output torque.

If a signal for making the opening degree of the throttle valve a target opening degree predetermined for the first operating region I is given to the electric motor 17, the opening degree of the throttle valve is reduced and the EGR rate is made to be increased from under 40 percent to about 70 percent. During this time, the EGR rate temporarily becomes between 40 percent to 60 percent, but the fuel injection is stopped at this time, so no soot all is produced.

When a certain time Δt elapses from the time $t_0$, the EGR rate is made the target EGR rate at the first operating region I. At this time, the injection amount and the injection timing are made the target injection amount and target injection timing in the first operating region I, respectively, and the supply of power for driving the electric motor 32 is stopped.

Figure 22:
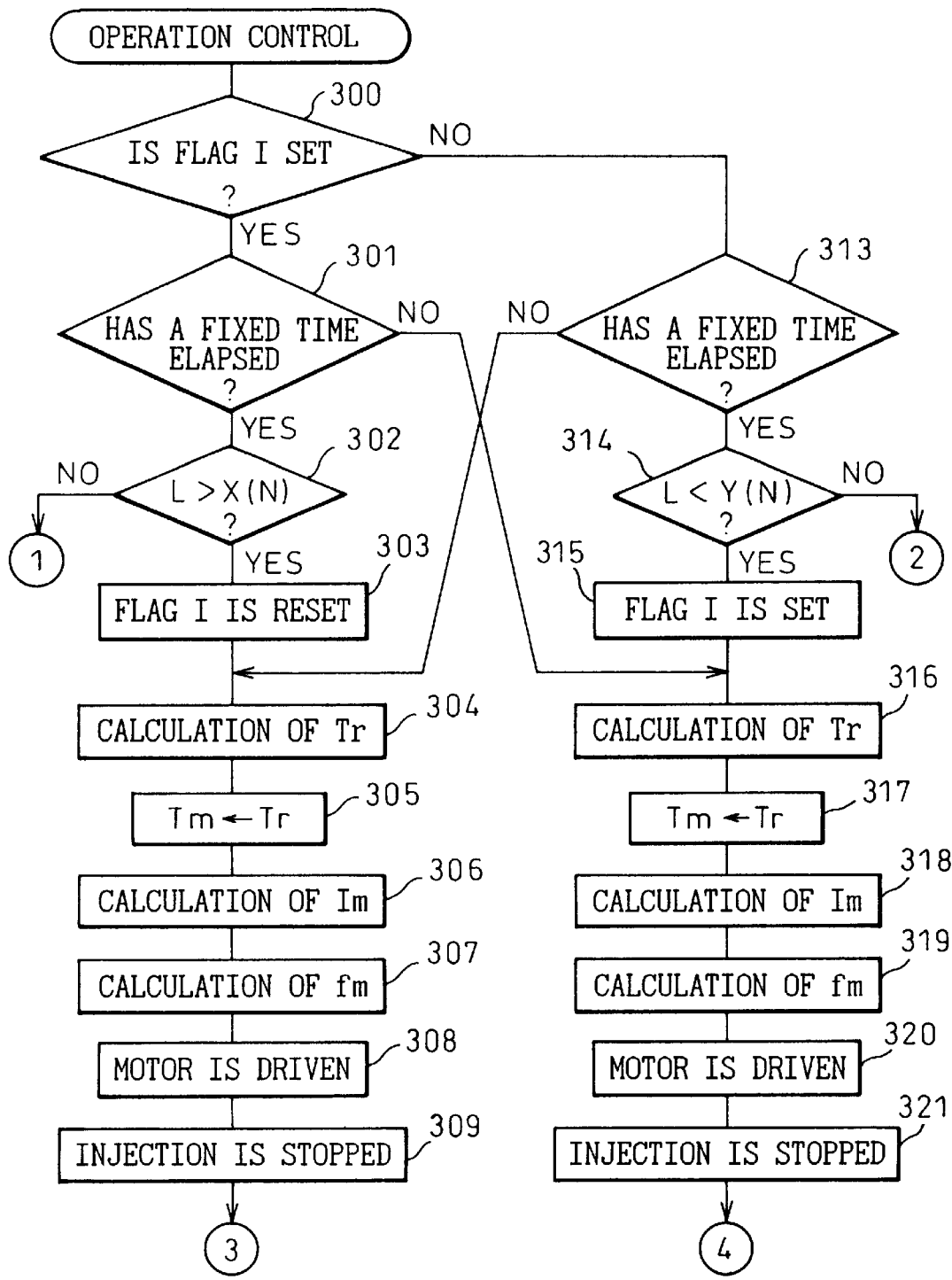
FIGS. 22 and 23 are flow charts of routine for the control of the operation in the third embodiment.
Figure 23:
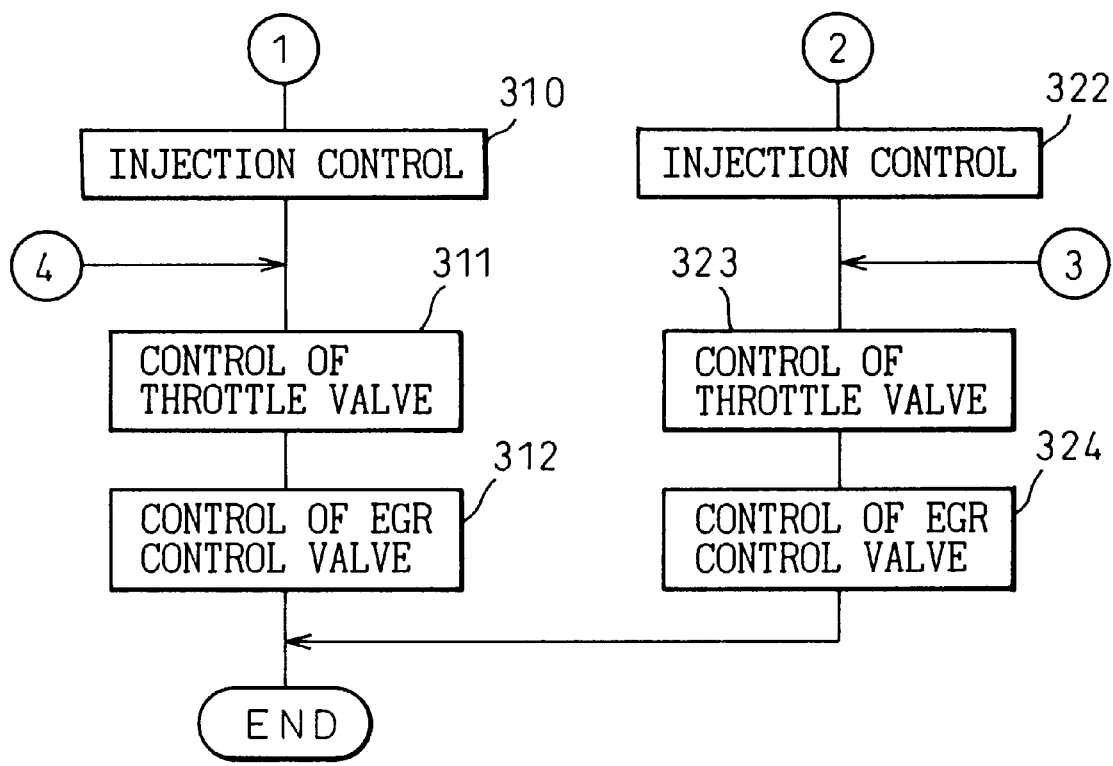

FIG. 22 and FIG. 23 show a routine for the control of the operation for working the third embodiment.

Referring to FIG. 22 and 23, first, at step 300, it is judged if a flag I showing that the engine is operating in the first operating region I has been set or not. When the flag I has been set, that is, when the engine is operating in the first operating region I, the routine proceeds to step 301, where it is judged if a certain time Δt (FIG. 21) has elapsed from when the flag I was set or not. When the certain time Δt has elapsed from when the flag I was set, the routine proceeds to step 302, wherein it is judged if the required load L has become larger than the first boundary X(N) shown in FIG. 8 or not.

When L≦X(N), the routine proceeds to step 310, where the injection amount, injection start timing θS, and injection completion timing θE corresponding to the required load L shown in the first operating region I of FIG. 10 are found and fuel is injected based on these. Next, at step 311, the opening degree of the throttle valve 18 is controlled to an opening degree in accordance with the required load L shown in the first operating region I of FIG. 10. Next, at step 312, the opening degree of the EGR control valve 25 is controlled to an opening degree in accordance with the required load L shown in the first operating region I of FIG. 10. Therefore, at this time, the first combustion is performed.

On the other hand, when it is judged at step 302 that L>X(N), the routine proceeds to step 303, where the flag I is reset. Next, at step 304, the current engine output torque Tr is calculated from the relationship shown in FIG. 11 based on the amount of depression L of the accelerator pedal 50 and the engine rotational speed N. Next, at step 305, the engine output torque Tr is made the output torque Tm to be generated by the electric motor 32.

Next, at step 306, the current value Im of the three-phase alternating current to be supplied to the electric motor 32 for the electric motor 32 to generate the output torque Tm is calculated. Next, at step 307, the frequency fm of the three-phase alternating current to be supplied to the electric motor 32 is calculated based on the engine rotational speed N. Next, at step 308, a three-phase alternating current of a current value Im and a frequency fm is supplied to the electric motor 32, whereby the electric motor 32 is driven. Next, at step 309, processing is performed for stopping the fuel injection.

Next, at step 323, the opening degree of the throttle valve 18 is controlled to the opening degree in accordance with the required load L shown in the second operating region II of FIG. 10. That is, the throttle valve 18 is made to open. Next, at step 324, the opening degree of the EGR control valve 25 is controlled to the opening degree in accordance with the required load L shown in the second operating region II of FIG. 10.

When the flag I is reset, the routine proceeds from step 300 to step 313, where it is judged if a certain time Δt (FIG. 20) has elapsed from when the flag I was reset or not. When the certain time Δt has not elapsed from when the flag I was reset, the routine proceeds to step 304. Therefore, it will be understood, when the flag I is reset, the electric motor 32 is driven for the certain time Δt and the fuel injection is stopped for that period.

On the other hand, when the certain time Δt has elapsed from when the flag I was reset, the routine proceeds to step 314, where it is judged if the required load L has become smaller than the second boundary Y(N) shown in FIG. 8. When L≧Y(N), the routine jumps to step 322, where the injection amount, injection start timing θS, and injection completion timing θE corresponding to the required load L shown in the second operating region II of FIG. 10 are found and fuel is injected based on these. Next, the routine proceeds to step 223. Therefore, at this time, the second combustion is performed.

Next, when it is judged at step 314 that L<Y(N), the routine proceeds to step 315, where the flag I is set. Next, at step 316, the current engine output torque Tr is calculated from the relationship shown in FIG. 11 based on the amount of depression L of the accelerator pedal 50 and the engine rotational speed N. Next, at step 317, the engine output torque Tr is made the output torque Tm to be generated by the electric motor 32.

Next, at step 318, the current value Im of the three-phase alternating current to be supplied to the electric motor 32 for the electric motor 32 to generate the output torque Tm is calculated. Next, at step 319, the frequency fm of the three-phase alternating current to be supplied to the electric motor 32 is calculated based on the engine rotational speed N. Next, at step 320, a three-phase alternating current of a current value Im and a frequency fm is supplied to the electric motor 32, whereby the electric motor 32 is driven. Next, at step 321, processing is performed to stop the fuel injection.

Next, at step 311, the opening degree of the throttle valve 18 is controlled to the opening degree in accordance with the required load L shown in the first operating region I of FIG. 10. That is, the throttle valve 18 is made to turn in the closing direction. Next, at step 212, the opening degree of the EGR control valve 25 is controlled to the opening degree in accordance with the required load L shown in the first operating region I of FIG. 10.

When the flag I is set, as explained above, the routine proceeds from step 300 to step 301, where it is judged if a certain time Δt (FIG. 21) has elapsed from when the flag I was set or not. When the certain time Δt has not elapsed from when the flag I was set, the routine proceeds to step 316. Therefore, it will be understood, when the flag I is set, the electric motor 32 is driven for the certain time Δt and the fuel injection is stopped for that period.

On the other hand, when the certain time Δt has elapsed from when the flag I was set, the routine proceeds to step 302, while when L≦X(N), the routine proceeds to step 310, where the first combustion is performed.

Next, an explanation will be made of the control of the operation at the time of an acceleration operation and a deceleration operation. In the embodiment of the present invention, the electric motor 32 is driven at the time of acceleration operation so as to obtain an excellent acceleration operation even during an acceleration operation in the operating region where the exhaust turbocharger 14 is not operating. On the other hand, during a deceleration operation, the electric motor 32 is made to operate as a generator and the power generated is retrieved.

Figure 24:
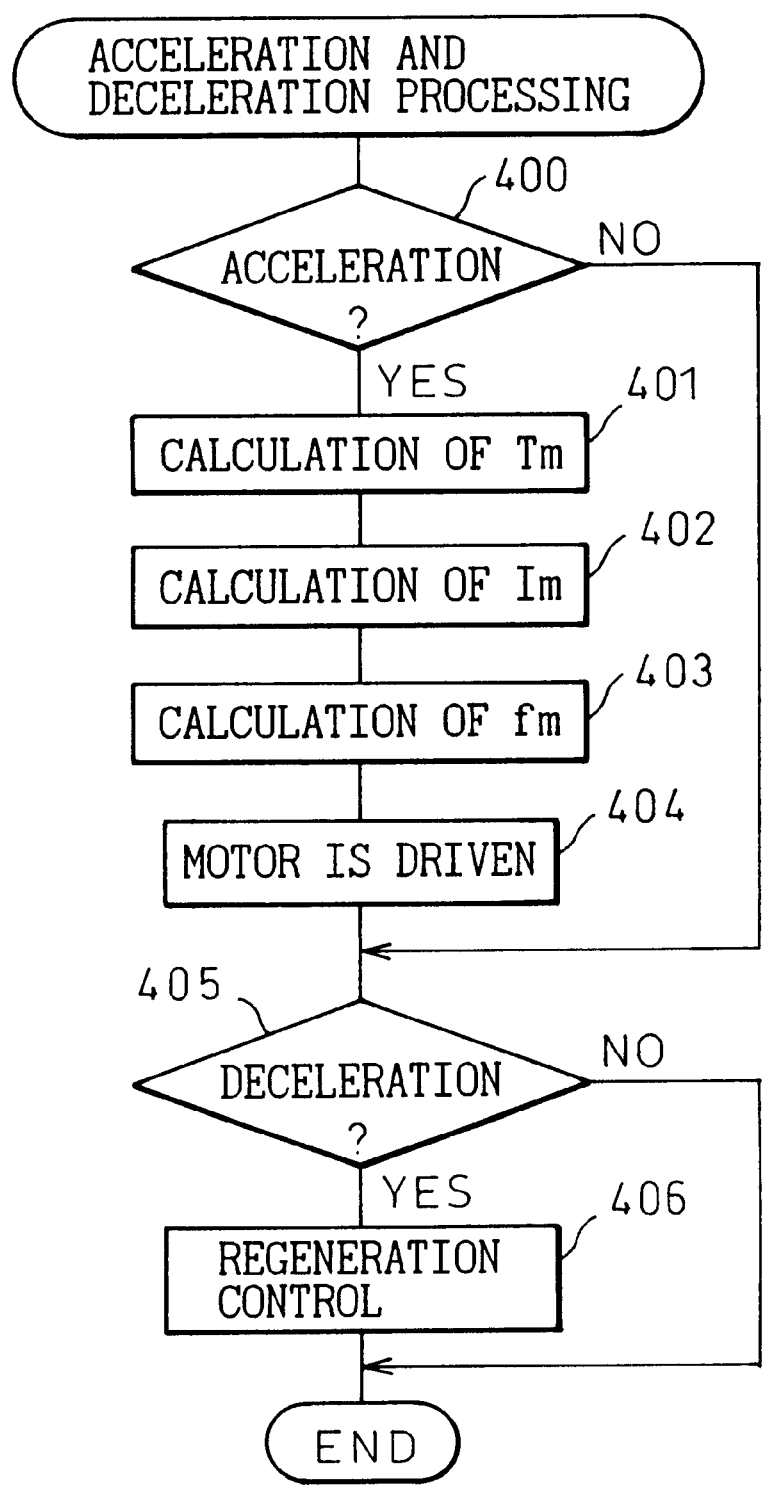
FIG. 24 is a flow chart of the processing for acceleration and deceleration.

FIG. 24 shows a processing routine at the time of acceleration and deceleration. This routine is executed by interruption at predetermined intervals.

Figure 25:
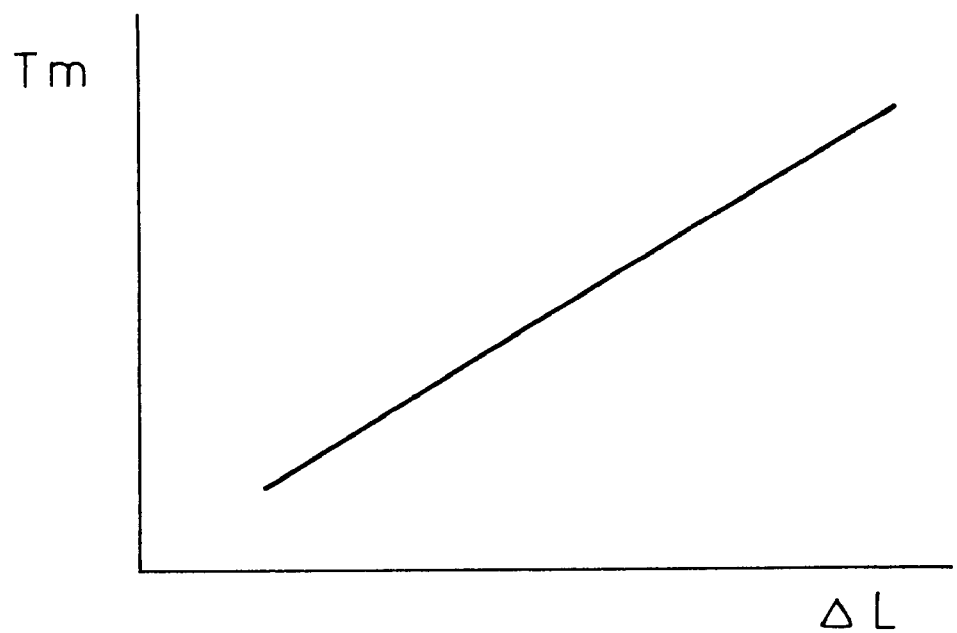
FIG. 25 is a view of the output torque to be generated by the electric motor.

Referring to FIG. 24, first, at step 400, it is judged if the engine is accelerating from the amount of change ΔL (>0) of the amount of depression L of the accelerator pedal 50, for example. When the engine is accelerating, the routine proceeds to step 401, where the output torque Tm to be generated by the electric motor 32 is calculated. The output torque Tm becomes larger the larger the amount of change ΔL of the amount of depression L of the accelerator pedal 50 as shown in FIG. 25. Next, at step 402, the current value Im of the three-phase alternating current to be supplied to the electric motor 32 for the electric motor 32 to generate the output torque Tm is calculated. Next, at step 403, the frequency fm of the three-phase alternating current to be supplied to the electric motor 32 is calculated based on the engine rotational speed N. Next, at step 404, the three-phase alternating current of the current value Im and the frequency fm is supplied to the electric motor 32, whereby the electric motor 32 is driven. In this way, at the time of an acceleration operation, the output torque of the electric motor is superposed over the output torque of the engine.

Next, at step 405, it is judged if the engine is decelerating from the amount of depression L of the accelerator pedal 50 and the engine rotational speed N, for example. When the engine is decelerating, the routine proceeds to step 406, where the electric motor 32 is made to operate as a generator and the power produced at that time is used to charge the battery 36.

According to the present invention, as mentioned above, it is possible to suppress the generation of soot when switching from the first combustion to the second combustion or from the second combustion to the first combustion.

While the invention has been described by reference to specific embodiments chosen for purposes of illustration, it should be apparent that numerous modifications could be made thereto by those skilled in the art without departing from the basic concept and scope of the invention.

What is claimed is:

1. A compression ignition type engine in which an amount of production of soot gradually increases and then peaks when an amount of inert gas in a combustion chamber increases and in which a further increase of the amount of inert gas in the combustion chamber results in a temperature of fuel and surrounding gas at the time of combustion in the combustion chamber becoming lower than a temperature of production of soot and therefore almost no production of soot any longer, said engine comprising:

switching means for selectively switching between a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks; and, drive power generating means for generating drive power separately from a drive power of the engine, the amount of fuel supplied to the engine being made to be reduced and drive power being generated from the drive power generating means when switching from the first combustion to the second combustion or from the second combustion to the first combustion by said switching means.

2. A compression ignition type engine as set forth in claim 1, wherein said drive power generating means is comprised of an electric motor.

3. A compression ignition type engine as set forth in claim 1, wherein said drive power generating means generates an output torque substantially equal to an amount of reduction of an output torque of the engine due to a reduction in the amount of fuel supplied when switching from the first combustion to second combustion or from the second combustion to first combustion.

4. A compression ignition type engine as set forth in claim 3, wherein an output torque of the engine determined from an operating state of the engine is stored in advance and, said drive power generating means calculates an amount of reduction of the output torque of the engine from the stored output torque of the engine and generates an output torque substantially equal to the calculated amount of reduction of the output torque of the engine when switching from the first combustion to the second combustion or from the second combustion to the first combustion.

5. A compression ignition type engine as set forth in claim 1, wherein the amount of fuel supplied is reduced to the amount of fuel supply required for idling operation when switching from the first combustion to the second combustion or from the second combustion to the first combustion.

6. A compression ignition type engine as set forth in claim 1, wherein the supply of fuel is stopped when switching from the first combustion to the second combustion or from the second combustion to the first combustion.

7. A compression ignition type engine as set forth in claim 1, wherein a throttle valve is disposed in an intake passage of the engine and made to rapidly open to an opening degree determined in accordance with the operating state of the engine when switching from the first combustion to the second combustion.

8. A compression ignition type engine as set forth in claim 1, wherein a throttle valve is disposed in an intake passage of the engine and made to rapidly close to an opening degree determined in accordance with the operating state of the engine when switching from the second combustion to the first combustion.

9. A compression ignition type engine as set forth in claim 1, wherein a throttle valve is disposed in an intake passage of the engine and, said throttle valve is made to close to an opening degree smaller than an opening degree determined in accordance with the operating state of the engine and then open to an opening degree determined in accordance with the operating state of the engine when switching from the second combustion to the first combustion.

10. A compression ignition type engine as set forth in claim 1, wherein an exhaust gas recirculation device is provided for causing exhaust gas exhausted from the combustion chamber to recirculate in an intake passage of the engine and, said inert gas is comprised of recirculated exhaust gas.

11. A compression ignition type engine as set forth in claim 10, wherein an exhaust gas recirculation rate when the first combustion is being performed is more than about 55 percent and an exhaust gas recirculation rate when the second combustion is being performed is not more than about 50 percent.

12. A compression ignition type engine as set forth in claim 10, wherein said exhaust gas recirculation apparatus is provided with an exhaust gas recirculation control valve for controlling an amount of recirculated exhaust gas and makes the exhaust gas recirculation control valve close to an opening degree smaller than the opening degree determined in accordance with the operating state of the engine, then open to the opening degree determined in accordance with the operating state of the engine when switching from the second combustion to the first combustion.

13. A compression ignition type engine as set forth in claim 1, wherein a fuel injection timing is advanced when switching from the first combustion to second combustion or from the second combustion to first combustion.

14. A compression ignition type engine as set forth in claim 1, wherein a catalyst having an oxidation function is arranged in an exhaust passage of the engine.

15. A compression ignition type engine as set forth in claim 14, wherein the catalyst is at least one of an oxidation catalyst, three-way catalyst, and NOx absorbent.

16. A compression ignition type engine as set forth in claim 1, wherein an engine operating region is divided into a low load side first operating region and a high load side second operating region, the first combustion is performed in the first operating region, and the second combustion is performed in the second operating region.

17. A compression ignition type engine as set forth in claim 1, wherein judging means for judging if the engine is accelerating or not is provided and, said drive power generating means generates drive power when it is judged that the engine is accelerating.

18. A compression ignition type engine as set forth in claim 1, wherein judging means for judging if the engine is decelerating is provided and, said driving power generating means is comprised of an electric motor driven by a battery, and said electric motor is used as a generator and power generated from said generator is used to charge a battery when the engine is decelerating.

* * * * *